United States Patent
Harkless et al.

(10) Patent No.: US 9,827,708 B2
(45) Date of Patent: Nov. 28, 2017

(54) TAPE APPLICATOR ASSEMBLY AND TAPE ASSEMBLY

(71) Applicant: GaffTech, LLC, Cheyenne, WY (US)

(72) Inventors: Jonathan D. Harkless, Newcastle, WA (US); Daniel T. Kretz, Snoqualmie, WA (US); Jason P. Covey, Snoqualmie, WA (US)

(73) Assignee: GaffTech, LLC, Cheyenne, WY (US)

( * ) Notice: Subject to any disclaimer, the term of this patent is extended or adjusted under 35 U.S.C. 154(b) by 0 days.

(21) Appl. No.: 15/054,016

(22) Filed: Feb. 25, 2016

(65) Prior Publication Data

US 2016/0250803 A1   Sep. 1, 2016

Related U.S. Application Data

(60) Division of application No. 14/601,391, filed on Jan. 21, 2015, now Pat. No. 9,302,426, which is a (Continued)

(51) Int. Cl.
*B29C 65/00* (2006.01)
*B44C 7/00* (2006.01)
(Continued)

(52) U.S. Cl.
CPC .......... *B29C 65/5092* (2013.01); *B29C 63/02* (2013.01); *B29C 63/024* (2013.01);
(Continued)

(58) Field of Classification Search
CPC .............. B65H 35/002; B65H 35/0013; B65H 35/0026; B65H 35/0033; B65H 35/005;
(Continued)

(56) References Cited

U.S. PATENT DOCUMENTS 2,972,428 A   2/1961   Dubbs
3,211,604 A  10/1965   Rymer
(Continued)

FOREIGN PATENT DOCUMENTS

CN   201834876 U   5/2011

OTHER PUBLICATIONS

International Search Report and Written Opinion dated Jun. 4, 2015, issued in corresponding International Application No. PCT/US2015/012170, filed Jan. 21, 2015, 11 pages.

*Primary Examiner* — Alex Efta
(74) *Attorney, Agent, or Firm* — Christensen O'Connor Johnson Kindness PLLC

(57) ABSTRACT

A tape applicator assembly for securing at least one cable within a corner defined by a first surface and a second surface that includes a body moveable along the at least one cable positioned on the first surface, a tape-receiving cavity defined in the body for receiving a tape assembly having tape, wherein the tape assembly is receivable within the tape-receiving cavity such that the tape is positioned for dispensing from the body, and a tape applying assembly defined within the body. The tape applying assembly is configured to adhere the tape to both the at least one cable and the first and second surfaces defining the corner as the body moves along the at least one cable on the first surface.

12 Claims, 19 Drawing Sheets

Related U.S. Application Data continuation-in-part of application No. 14/167,557, filed on Jan. 29, 2014, now abandoned, and a continuation-in-part of application No. 14/166,656, filed on Jan. 28, 2014, now abandoned.

(60) Provisional application No. 62/084,474, filed on Nov. 25, 2014, provisional application No. 62/057,846, filed on Sep. 30, 2014.

(51) Int. Cl.

| | | |
|---|---|---|
| *B29C 65/50* | (2006.01) | |
| *B32B 37/20* | (2006.01) | |
| *B32B 37/12* | (2006.01) | |
| *B32B 38/18* | (2006.01) | |
| *B29C 63/02* | (2006.01) | |
| *B65H 37/00* | (2006.01) | |
| *B65H 35/00* | (2006.01) | |
| *B65H 37/04* | (2006.01) | |
| *B65H 16/00* | (2006.01) | |
| *B65H 16/04* | (2006.01) | |
| *B29L 9/00* | (2006.01) | |
| *B29L 31/34* | (2006.01) | |
| *C09J 7/02* | (2006.01) | |
| *C09J 7/04* | (2006.01) | |

(52) U.S. Cl.
CPC .......... *B32B 37/1284* (2013.01); *B32B 37/20* (2013.01); *B32B 38/18* (2013.01); *B65H 16/005* (2013.01); *B65H 16/04* (2013.01); *B65H 35/0033* (2013.01); *B65H 37/005* (2013.01); *B65H 37/04* (2013.01); *B29L 2009/00* (2013.01); *B29L 2031/3462* (2013.01); *B32B 2307/202* (2013.01); *B32B 2405/00* (2013.01); *B32B 2457/00* (2013.01); *B65H 2301/41518* (2013.01); *B65H 2402/412* (2013.01); *B65H 2701/1922* (2013.01); *C09J 7/02* (2013.01); *C09J 7/04* (2013.01); *Y10T 156/1788* (2015.01); *Y10T 156/1795* (2015.01)

(58) Field of Classification Search
CPC .............. B65H 35/008; B65H 2701/32; B65H 2601/326; H02G 1/00; B29C 63/02; B29C 63/024

See application file for complete search history.

(56) References Cited

U.S. PATENT DOCUMENTS

| | | | |
|---|---|---|---|
| 3,364,096 A | 1/1968 | Hetes | |
| 4,109,878 A | 8/1978 | Osawa | |
| 4,208,239 A | 6/1980 | Lass | |
| 4,459,165 A * | 7/1984 | Meis | H02G 1/00 |
| | | | 156/436 |
| 4,707,202 A | 11/1987 | Sweeny | |
| 5,211,784 A | 5/1993 | Haibach et al. | |
| 5,676,298 A | 10/1997 | Lam | |
| 6,024,148 A | 2/2000 | Saitoh et al. | |
| 6,912,798 B2 | 7/2005 | Blau et al. | |
| 6,973,951 B2 | 12/2005 | Henegar | |
| 9,302,426 B2 * | 4/2016 | Harkless | B29C 65/5092 |
| 2006/0096714 A1 | 5/2006 | Chen | |
| 2013/0048218 A1 | 2/2013 | Lam | |
| 2013/0098557 A1 * | 4/2013 | Takeuchi | B65H 35/004 |
| | | | 156/349 |
| 2014/0130983 A1 * | 5/2014 | Frederick | B65H 35/004 |
| | | | 156/510 |

\* cited by examiner

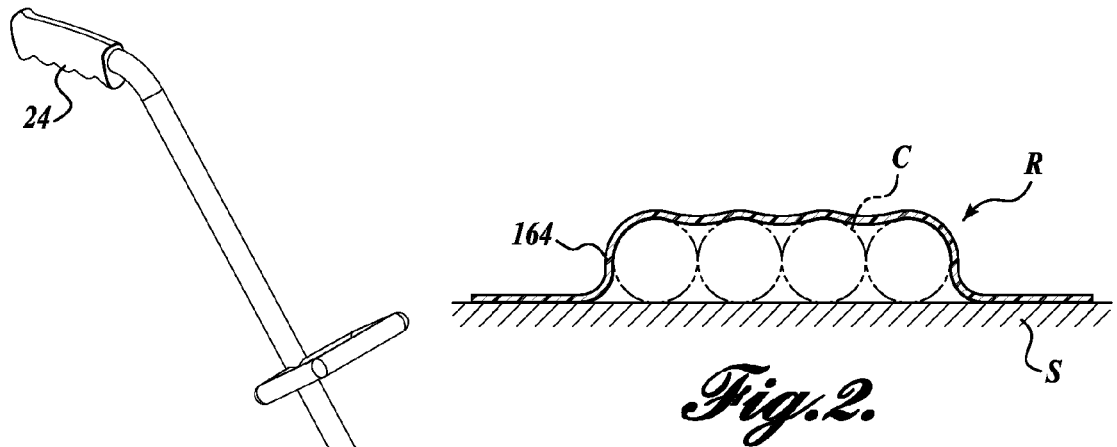
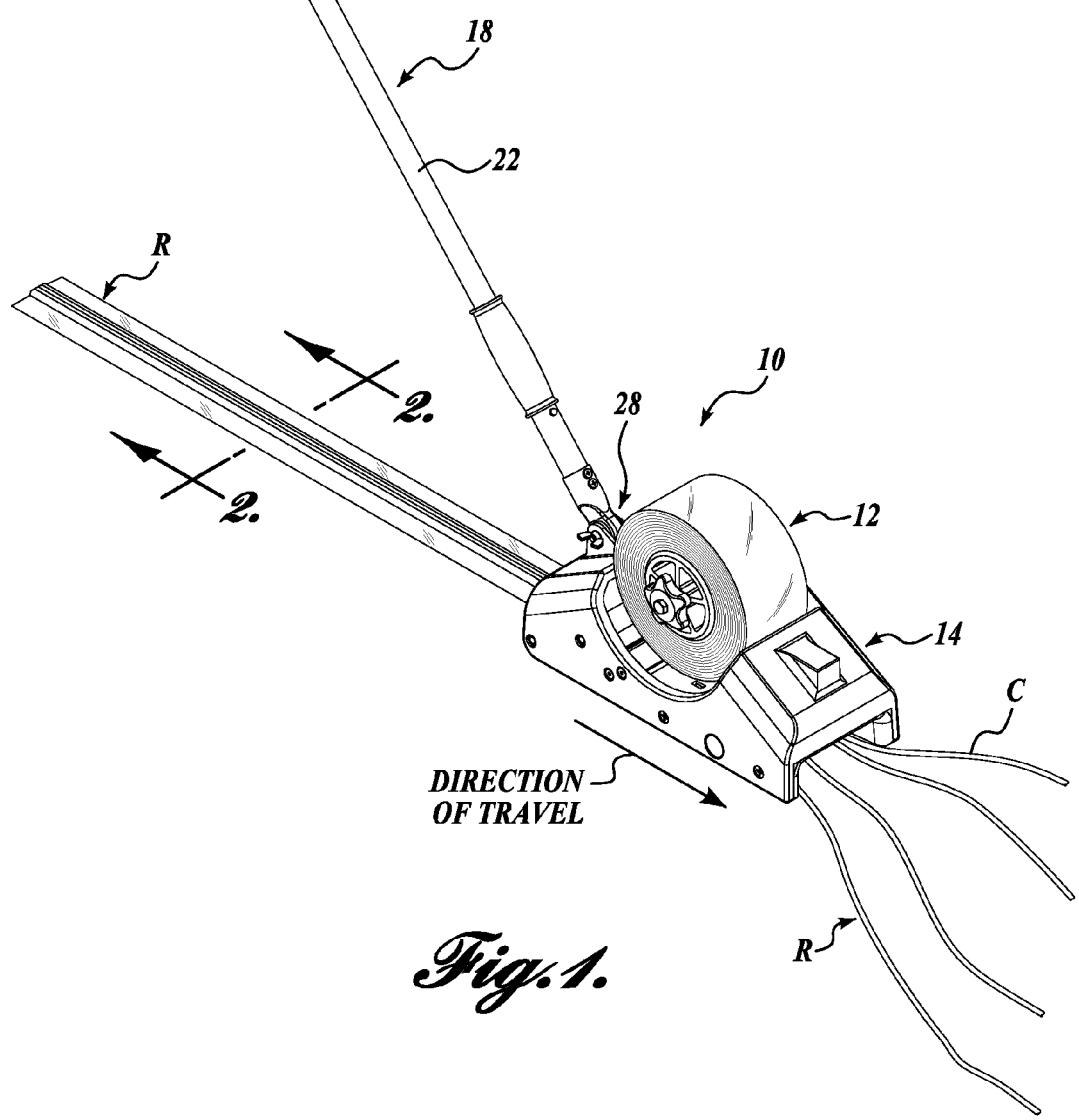

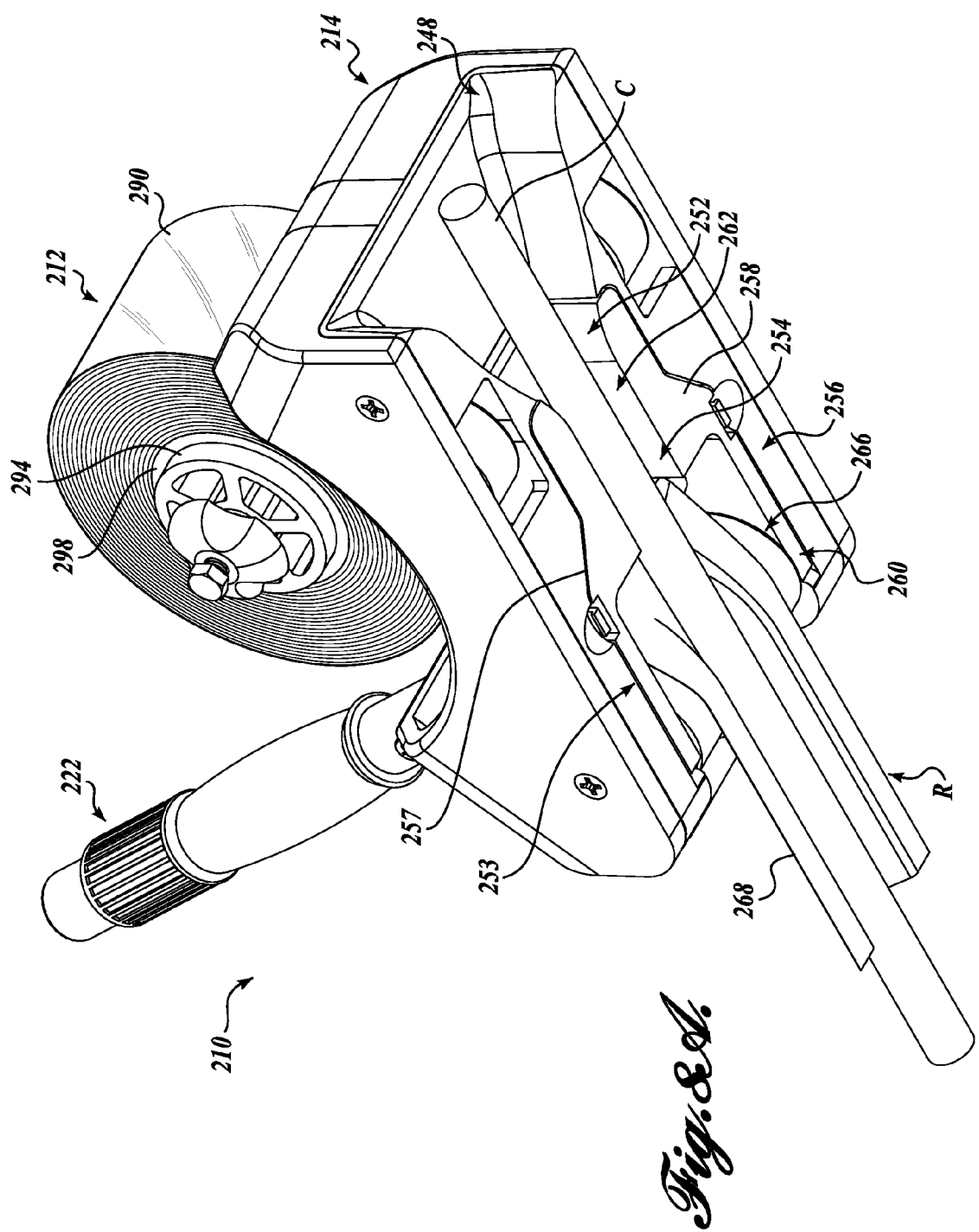

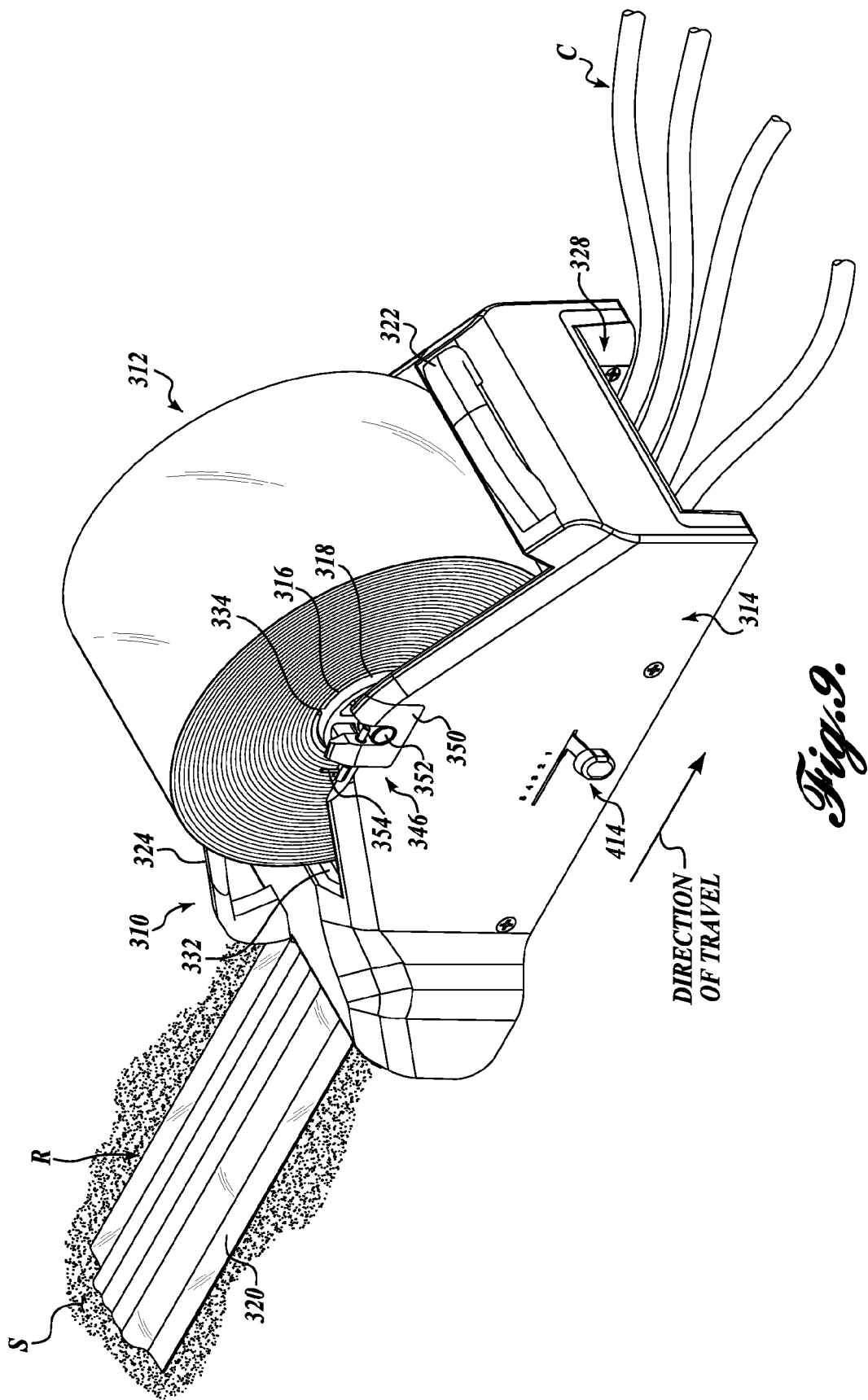

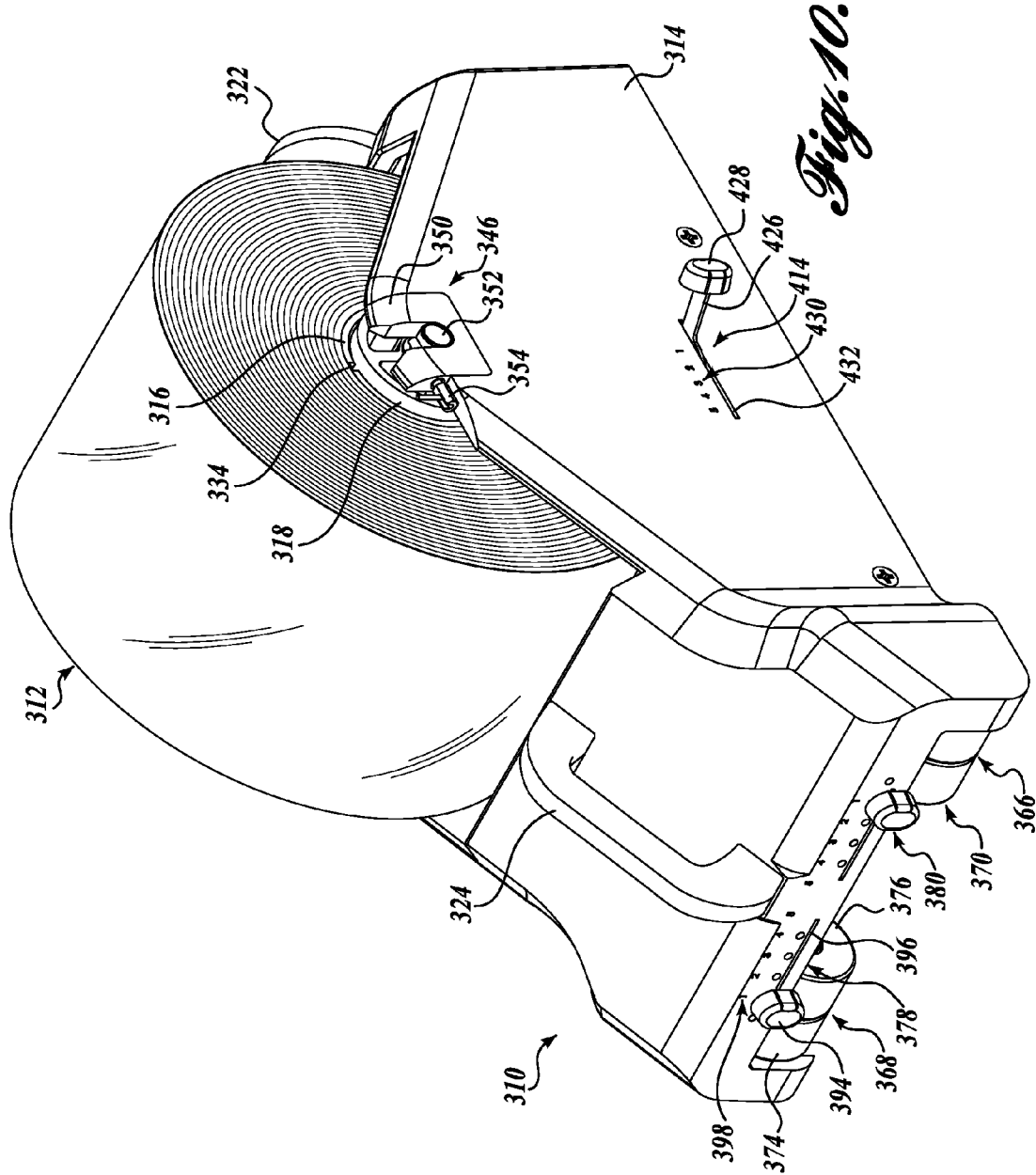

TAPE APPLICATOR ASSEMBLY AND TAPE ASSEMBLY

CROSS-REFERENCES TO RELATED APPLICATIONS

This application is a division of U.S. patent application Ser. No. 14/601,391, filed Jan. 21, 2015, which is a continuation-in-part of U.S. patent application Ser. No. 14/166,656, filed Jan. 28, 2014, and Ser. No. 14/167,557, filed Jan. 29, 2014, the disclosures of which are hereby incorporated by reference in their entirety. This application also claims the benefit of U.S. Provisional Application Nos. 62/057,846, filed Sep. 30, 2014, and 62/084,474, filed Nov. 25, 2014, the disclosures of which are hereby incorporated by reference in their entirety.

BACKGROUND

Gaffer tape is a specialized type of pressure-sensitive adhesive tape that is often used in the entertainment industry for securing cables to the stage floor or other surface, either for safety or to keep them out of view of the audience or camera. It is also widely used by audio-visual departments in hotels and conference centers for holding down wires to podiums and stages.

A "gaffer" or other technician will often run one or more cables (hereinafter sometimes referred to as a "cable run") between two or more locations and then tape the cables to a surface. For instance, the cable run may extend between an electrical outlet and audio equipment, with the cable run taped to the floor, wall, or other surface. Before taping the cable run, or as the cable run is being taped to the surface, it is often desired to bundle, straighten, and pull the cable run taught. Aligning and bundling the cable run as it is being taped creates straighter tape lines, minimizes the strips of tapes used, reduces any tripping hazards, and makes the taped cable run more aesthetically pleasing.

It can be appreciated that aligning and bundling the cable run in this manner is a labor-intensive, imperfect process. The gaffer must bundle, align, and pull the cable run with one hand while taping the cable run to a surface with the other hand. Thus, an improved device and method for securing aligned, bundled, taught cable(s) to a surface is desired.

As mentioned above, gaffer tape is a specialized type of pressure-sensitive adhesive tape often used to tape a cable run to a surface. The pressure-sensitive adhesive is sufficiently strong to secure the cable run to a surface until the tape is manually removed with a predetermined amount of force. Although gaffer tape is designed to be cleanly removed from cables (unlike a tackier tape such as duct tape), the tape can still get wrapped around or folded between the cable(s), causing the tape to stick to itself during the removal process. Moreover, when cables are "gaffed" often, adhesive residue builds up on the cables, making it more difficult to remove the tape from the cable. Thus, it can be further appreciated that an improved tape assembly suitable for use in gaffing cables is also desired.

SUMMARY

A tape applicator assembly for securing tape to a surface includes a body and may include a centering and locking assembly configured to automatically center and lock a tape assembly within the body for dispensing. The tape applicator assembly may further be configured for securing tape to at least one cable and a surface, wherein the body includes a tape-receiving cavity defined for receiving a tape assembly having tape with a tape center longitudinal axis. A tape applying assembly may be defined within the body that is configured to adhere the tape to both the at least one cable and the surface. A cable alignment assembly may also be defined within the body that is configured to receive at least one cable positioned against the surface and substantially align the at least one cable with the tape center longitudinal axis. This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 1 is an environmental isometric view of a tape applicator assembly and tape assembly, wherein the tape applicator assembly and tape assembly are shown in use taping a cable run to a surface;

FIG. 2 is a cross-sectional view of a taped cable run of FIG. 1, taken substantially across line 2-2;

FIG. 8A is a bottom isometric view of a first alternate embodiment of a tape applicator assembly, wherein the tape applicator assembly is shown in use taping a cable to a surface;

FIG. 9 is a front isometric view of a second alternate embodiment of a tape applicator assembly, wherein the tape applicator assembly is shown in use taping cables to a surface;

FIG. 10 is a rear isometric view of the tape applicator assembly of FIG. 9;

DETAILED DESCRIPTION

Figure 3:
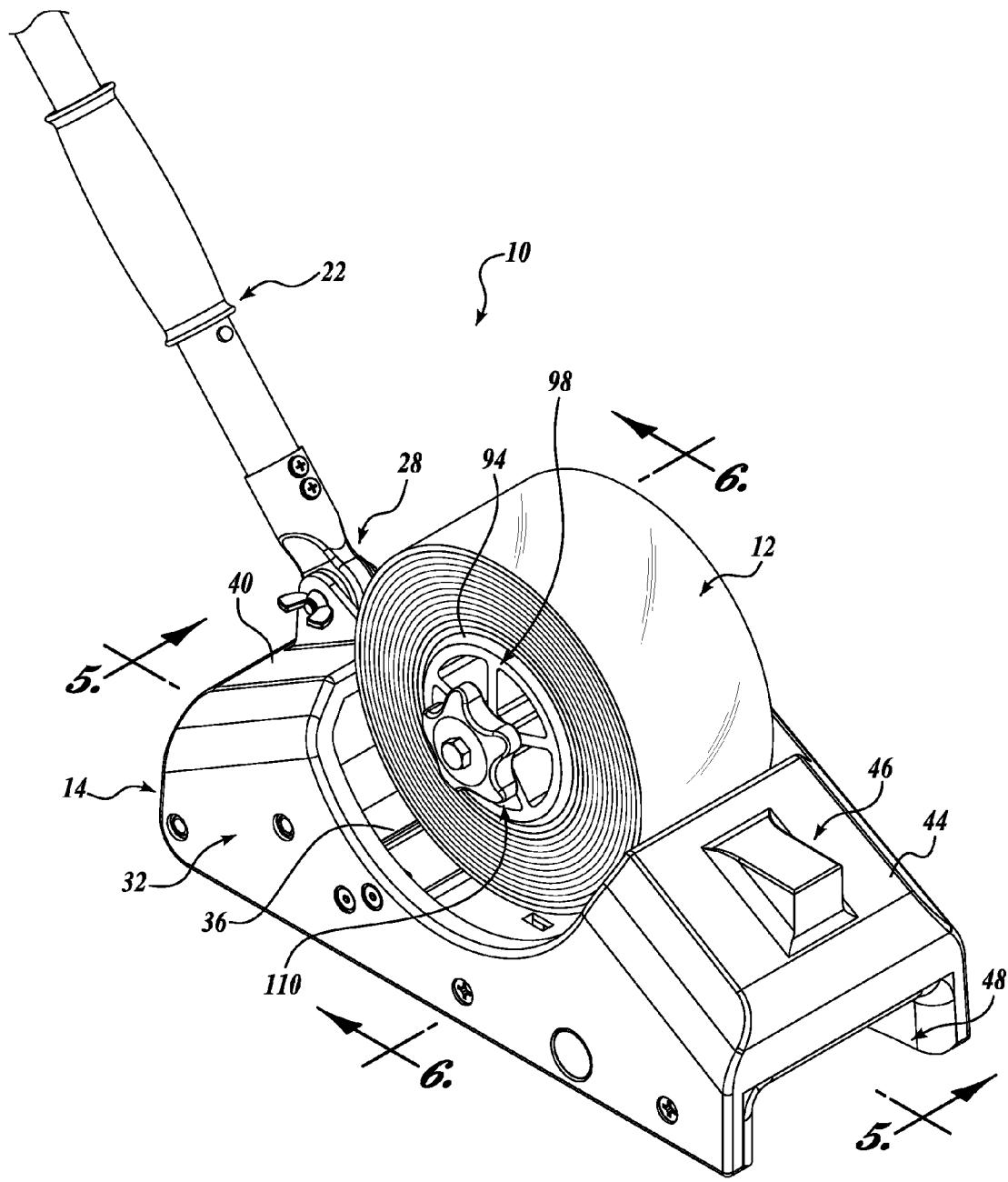
FIG. 3 is a partial top isometric view of the tape applicator assembly and tape assembly of FIG. 1.

A tape applicator assembly 10 and tape assembly 12 formed in accordance with an exemplary embodiment of the present disclosure may best be seen by referring to FIG. 1. Referring additionally to FIG. 2, the tape applicator assembly 10 is configured to bundle, align, and tighten one or more cables C in a cable run R and tape the cable run R to a surface S. Although the tape applicator assembly 10 will be described as being used to tape a cable run R to a surface, it should be appreciated that the tape applicator assembly 10 may be used for any suitable purpose. For instance, the tape applicator assembly 10 may be used with a tape assembly 12 comprising gaffer tape suitable for taping cables to a surface. In the alternative, the tape applicator assembly 10 may be used with a tape assembly 12 comprising another suitable tape for temporarily fixing or labeling equipment, marking seating diagrams, walls, walkways, boundaries, etc. Thus, it should be appreciated that the descriptions and illustrations provided herein should not be seen as limiting the scope of the claimed subject matter.

The tape applicator assembly 10 includes a body 14 and a handle assembly 18 secured thereto. The handle assembly 18 is suitable for pushing, steering, and manipulating the body 14 against a surface. Although any suitable handle assembly may be used, in the depicted embodiment, the handle assembly 18 includes a stem 22 extending upwardly from the body 14, which may be pivotally connected to the body 14 through a pivot connection 28 or through any suitable means. The stem 22 may be adjustable in length, and it may be removable in the event that the user desires to grasp the body 14 for use. A suitable handle 24 is defined at the distal end of the stem 22 for grasping the handle assembly 18. Additional gripping devices, handles, etc., may be secured to the stem 22 for suitably pushing, steering, and manipulating the body 14 against a surface.

The body 14 is suitable for removably receiving a portion of the tape assembly 12 and taping a cable run R to a surface. Prior to taping the cable run R to a surface, the body 14 gathers, aligns, bundles, and tightens one or more cables C for creating an aesthetically-pleasing, safe, taped cable run R.

Referring to FIGS. 3-6, aspects of the body 14 for gathering, aligning, bundling, tightening, and taping one or more cables to a surface will now be described in detail. Referring specifically to FIG. 3, the body 14 includes an upper portion 32 having a tape-receiving cavity 36 defined between a rear portion 40 and a front portion 44. The handle stem 22 is pivotally secured to the rear portion 40 for pushing the body 14 forward over and along the desired cables on a surface.

A cable alignment assembly is defined within the body 14 for receiving and substantially aligning one or more cables positioned against a surface as the body moves along the surface. The cable alignment assembly may include an alignment device, such as a laser 46 or other light-centering mechanism, secured to or otherwise defined on the front portion 44. The laser 46 may project a beam onto the surface to help guide the user in taping a straight line of cables.

Figure 4:
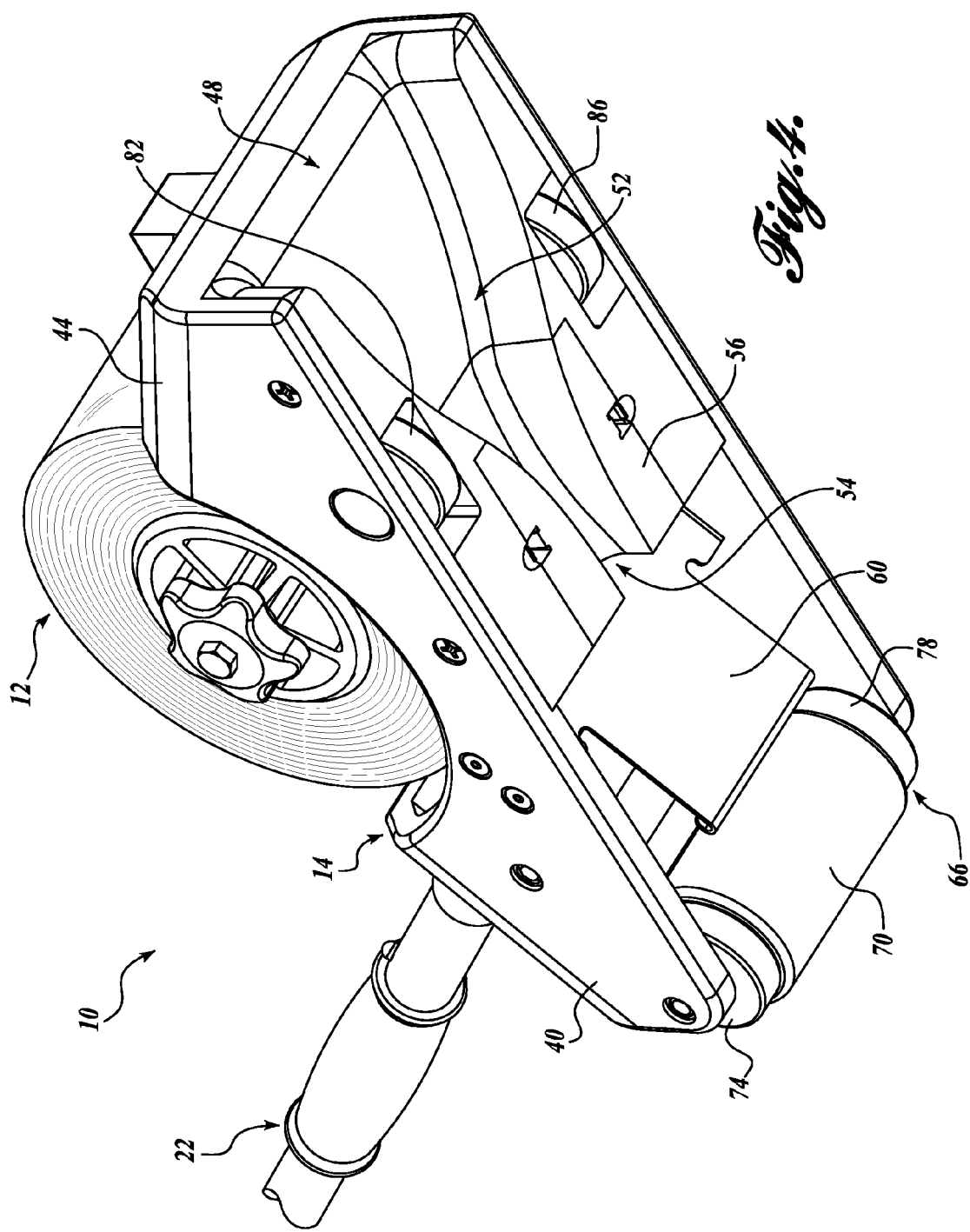
FIG. 4 is a partial bottom isometric view of the tape applicator assembly and tape assembly of FIG. 1.

The cable alignment assembly further includes a front cable opening 48 that is defined at a front end of the body 14 beneath the laser 46 that is suitable for receiving one or more cables positioned against a surface as the tape applicator assembly 10 is moved along the cables on the surface. Referring to FIG. 4, the front cable opening 48 is in communication with a funnel 52 that extends rearwardly along a bottom, interior, open surface of the body 14 and terminates in a rear cable opening 54. The funnel 52 tapers in width between the front and rear cable openings 48 and 54 for gathering and bundling the cables prior to being taped.

The funnel 52 may include a removable and/or adjustable rear funnel piece 56 at the rear end of the funnel 52 for adjusting the size of the rear cable opening 54. In the depicted embodiment, the rear funnel piece 56 is removably secured within the bottom of the body 14 by suitable snap-fit technology or other suitable means. The rear funnel piece 56 may be removed and replaced/interchanged with another rear funnel piece defining a larger or smaller rear cable opening 54 to bundle more or less cables for taping. In the alternative, the rear funnel piece 56 may include adjustment means for adjusting the size of the rear cable opening 54 without necessitating the removal of any pieces.

It should be appreciated that the size and shape of the rear funnel piece 56 may be configured to position one or more cables to be taped in a desired manner. For instance, the rear funnel piece 56 may include a small central opening to center and tape a single cable to a surface with tape. As another example, the rear funnel piece 56 may include a deeper and wider opening to center and bundle several cables for taping. As yet another example, the rear funnel piece 56 may include a wider, shallower opening for positioning several cables side by side for taping (see FIG. 2). Thus, it can be appreciated that the size, shape, and configuration of the rear funnel piece 56 may be designed for use in any desired configuration.

The cable alignment assembly further includes a suitable biasing or tensioning member and is positioned rear of the funnel 52 for applying pressure and tension to the one or more cables as they are fed through the body 14. In the depicted embodiment, the tensioning member is embodied as a flat spring 60 configured to bias the funneled cables C away from the body 14 (i.e., toward the surface) as the body 14 is being moved along the cables C on the surface S. In that regard, the flat spring 60 is secured at its upper end to an interior portion of the body 14 and extends downwardly past the bottom, interior, open surface of the body 14 and toward the rear of the body 14 in an original, unbiased state. The flat spring 60 is movable into an upwardly flexed, biased position when engaged with the cables C. In the biased position, the flat spring 60 continuously engages and urges the cables C toward the surface S. By continuously applying tension to the cables, the cables are pulled taught and straight and are maintained in their centered, bundled positioned as tape is applied.

A tape applying assembly is defined within the body 14 and is in communication with the cable alignment assembly for applying tape to the aligned, bundled, tightened cables positioned on a surface. The tape applying assembly includes a rear wheel assembly 66 positioned rear of the flat spring 60 for applying tape to both the cables C and the surface S.

Figure 5:
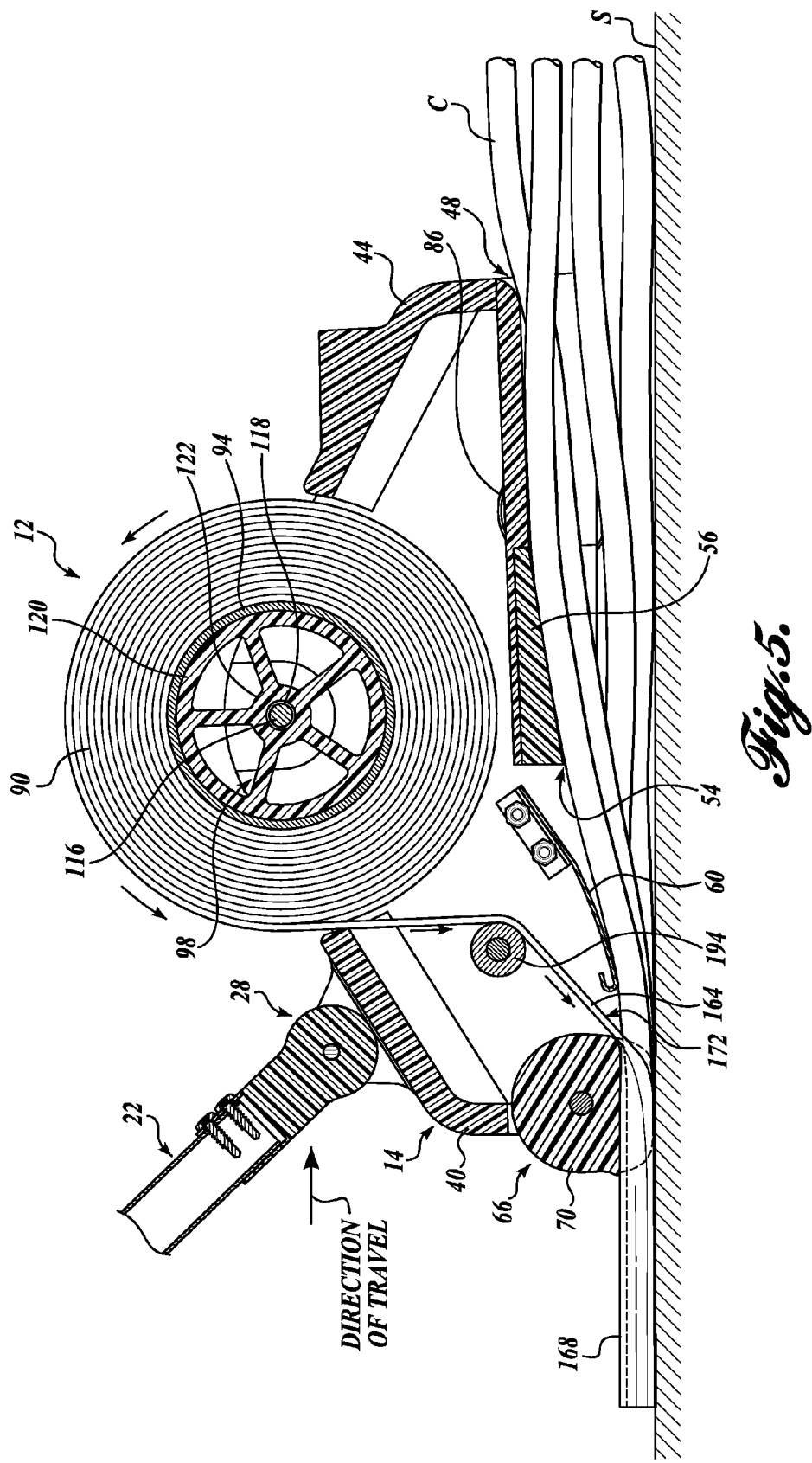
FIG. 5 is a partial cross-sectional view of the tape applicator assembly and tape assembly of FIG. 3, taken substantially across line 5-5, wherein the tape applicator assembly and tape assembly is shown in use taping cables to a surface.

Referring to FIGS. 4 and 5, the rear wheel assembly 66 includes a middle tape applying portion 70 disposed between lateral rear rolling wheels 74 and 78. The lateral rear rolling wheels 74 and 78 are disposed on each lateral interior side of the body 14 and are journaled for rotation within the body 14 in any suitable manner, such as by a pin or rod (not labeled) extending through the rear wheel assembly 66 and rotatably received each lateral interior side of the body 14. The rear wheel assembly 66 is disposed within the body 14 such that the lateral rear rolling wheels 74 and 78 protrude from the bottom, rear, open surface of the body 14 for allowing the body 14 to roll against a desired surface.

In that regard, lateral front rolling wheels 82 and 86 protrude from the bottom, front surface of the body 14 on each lateral interior side of the body 14 to allow the body 14 to easily roll along a desired surface. The lateral front rolling wheels 82 and 86 may be positioned on each lateral side of the funnel 52 and may be journaled for rotation within the body 14 in any suitable manner, such as by a pin or rod (not labeled) rotatably extending through each front rolling wheel 82 and 86 and rotatably disposed within the respective lateral interior side of the body 14. With the rear and front lateral rolling wheels 74, 78, 82, and 86 disposed on the interior of the body 14, the body 14 may be easily positioned against a sidewall or other object as the body 14 is moved along a surface.

The middle tape applying portion 70 disposed between the lateral rear rolling wheels 74 and 78 is configured to apply tape and pressure to the bundled cables and the surface for securing the cables to a surface. In that regard, the middle tape applying portion 70 is sufficiently pliable to apply pressure to both the cables and the surface as it rolls along both. More specifically, the middle tape applying portion 70 radially deforms, compresses, etc., in a middle portion to apply pressure to the cables. The middle tape applying portion 70 also radially deforms, compresses, etc. in lateral portions to apply pressure to the surface on each side of the cables and to accommodate the surface contour. The middle and lateral portions can deform as needed to continuously and evenly apply pressure to the cables and any uneven surface. In that regard, with the tape disposed between the middle tape applying portion 70 and the cables/surface, the tape is adhered to both the cables and the surface as the middle tape applying portion 70 is rolled along the cables.

To accommodate the compression of the middle tape applying portion 70, the lateral rear rolling wheels 74 and 78 are sufficiently smaller in diameter than the middle tape applying portion 70. In this manner, when the middle tape applying portion 70 compresses to apply pressure to the cables/surface, the lateral rear rolling wheels 74 and 78 engage the surface to allow the body 14 to roll along the surface. However, it should be appreciated that the lateral rear rolling wheels 74 and 78 may instead be eliminated, with the body 14 rolling along the surface solely through the middle tape applying portion 70.

The middle tape applying portion 70 may be made from any suitable material for sufficiently applying pressure to both the cables and the surface. For instance, the middle tape applying portion 70 may be made from foam, rubber, or another suitable material. It should be appreciated that the middle tape applying portion 70 may instead be substantially rigid with a center radial groove for receiving the cables and lateral portions on each side of the groove for engaging the surface. The groove would be of a sufficient depth to apply pressure to the cables while the lateral portions maintained pressure on the surface. Thus, it should be appreciated that any suitable configuration for simultaneously applying pressure to the bundled cables and the surface may be used.

As noted above, tape is fed between the middle tape applying portion 70 and the cables/surface such that the middle tape applying portion 70 may simultaneously apply tape to both the cables and the surface. The tape is dispensed from the tape assembly 12 secured within the tape applicator assembly 10.

Figure 6:
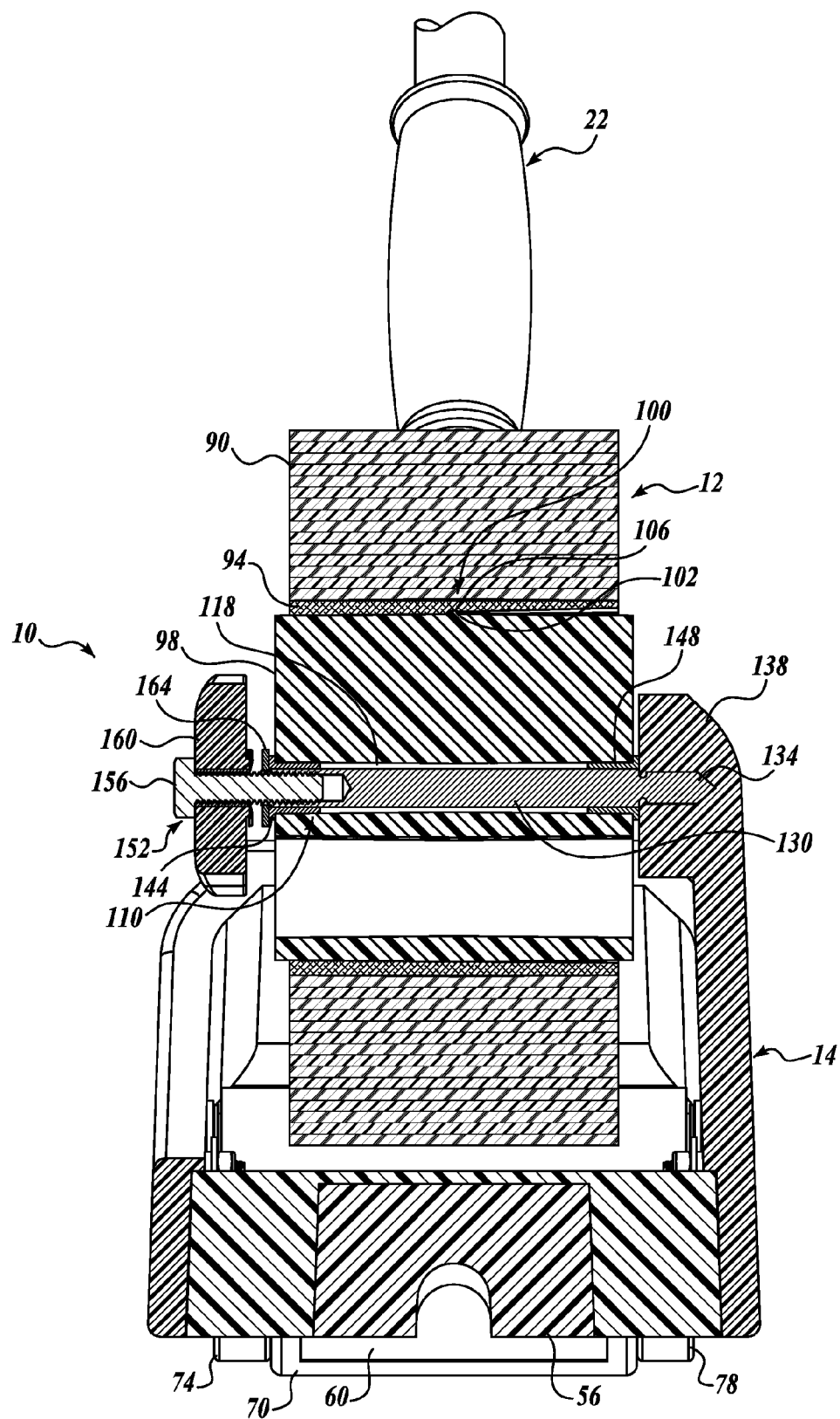
FIG. 6 is a cross-sectional view of the tape applicator assembly and tape assembly of FIG. 3, taken substantially across line 6-6.
Figure 7:
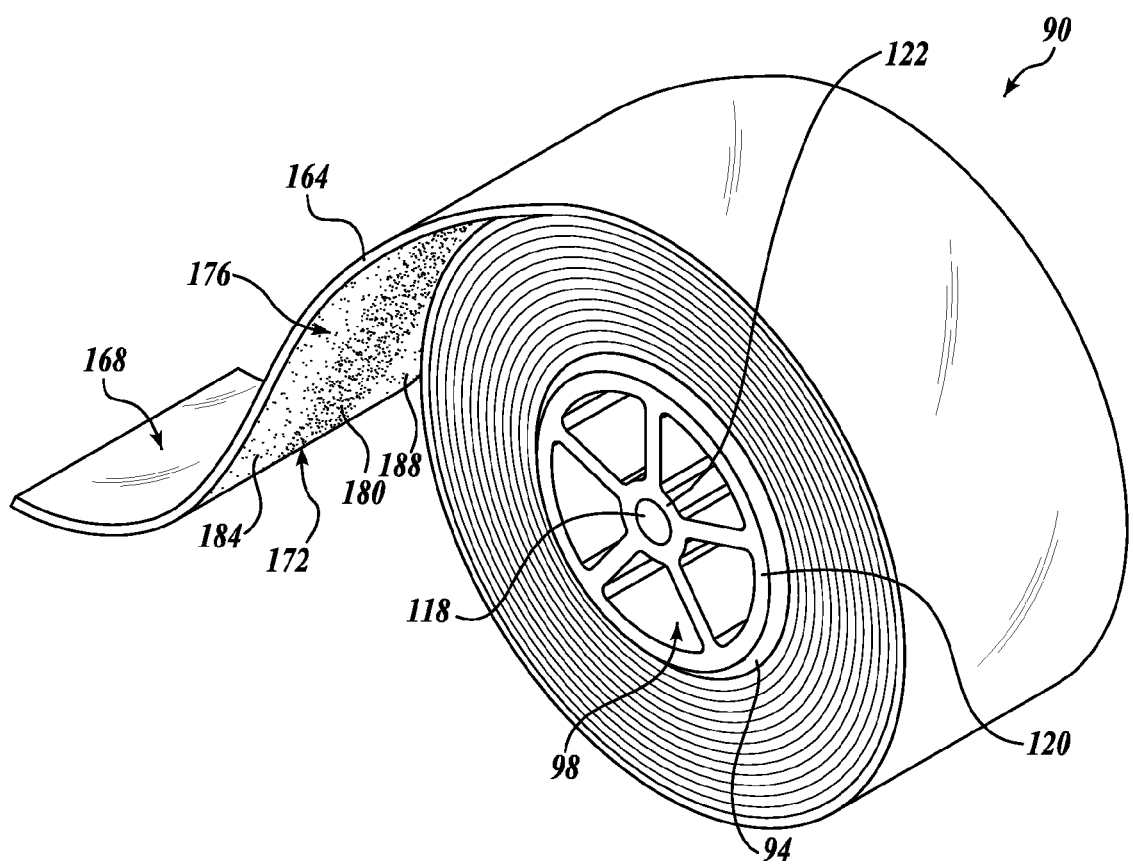
FIG. 7 is an isometric view of the tape assembly of FIG. 1.

Referring to FIGS. 5-7, a portion of the tape assembly 12 and the structure for securing the tape assembly 12 within the tape applicator assembly 10 will now be described in detail. The tape assembly 12 includes a tape roll 90 wound around or otherwise positioned circumferentially on a core 94. The core 94 is substantially cylindrical in shape and defines a core axial length that accommodates the width of the tape roll 90. The core 94 may be any suitable core axial length to accommodate various size tape rolls, such as 2 inches, 3 inches, etc. The core 94 also defines an interior cylindrical opening extending along the core axial length. The hollow cylindrical opening has an interior core diameter that is sized and configured to receive a hub 98, which is removably securable within the tape-receiving cavity 36 of the body 14 to secure the tape assembly 12 within the tape applicator 10.

The hub 98, like the core 94, is cylindrical in shape and is defined by a web assembly 116 extending between an exterior cylindrical body portion 120 and an interior cylindrical body portion 122, with a center axial through-hole 118 extending axially through the interior cylindrical body portion 122. It should be appreciated that the web assembly 116 decreases the cost and weight of the hub 98; however, the hub 98 may instead be defined by a solid body extending between the exterior and interior cylindrical body portions 120 and 122.

The hub 98 defines an exterior diameter that is substantially equal to the interior diameter of the core 94. In this manner, the core 94 may be removably, yet securely disposed on the hub 98 for use within the tape applicator assembly 10. The 98 defines a hub axial length that is sized to be removably received within the core 94. The hub 98 may have any suitable axial length to accept various-sized cores 94 while at the same time being sized and configured to be received within the tape-receiving cavity 36 of the body 14.

A core centering and locking assembly 100 is defined between the core 94 and hub 98 for securing and centering the core 94 onto the hub 98. Although any suitable centering and locking assembly may be used, in the depicted embodiment, the core centering and locking assembly 100 comprises a first locking feature, such as a protrusion or nub 102, defined on the exterior surface of the hub 98 that is receivable within a second locking feature, such as an annular groove 106, defined on the interior surface of the core 94 to secure the core 94 onto the hub 98. It should be appreciated that the nub 102 may instead be defined on the hub 98, and the annular groove 106 defined on the core 94.

The nub 102 and annular groove 106 are positioned on the hub 98 and core 94, respectively, such that the core 94 is automatically centered axially on the hub 98 when the nub 102 is received within the annular groove 106. In other words, the nub 102 is substantially centered axially on the hub 98, and the annular groove 106 is substantially centered axially on the core 94. In this manner, the core 94 will be automatically centered axially on the hub 98 when the nub 102 is received within the annular groove 106. With the groove 106 centered axially on the core 94, it should be appreciated that regardless of its axial length (i.e., 1 inch in axial length, 2 inches in axial length, 3 inches in axial length, etc.), the core 94 will be automatically centered on the hub 98.

The tape assembly 12 is further secured on the hub 98 through a hub locking assembly 110. The hub locking assembly 110 is defined by a shaft 130 secured within the body 14 and extending into the tape-receiving cavity 36. The shaft 130 includes an anchor 134 defined at a first end that is secured within an anchor protrusion 138 extending upwardly from one side of the body 14. The shaft 130 extends into the tape-receiving cavity 36 substantially transversely to the anchor protrusion 138 such that the shaft 130 is substantially parallel to the bottom surface of the body 14.

With the shaft 130 extending into the tape-receiving cavity 36 in this manner, the hub 98 may be removably and rotatably secured on the shaft 130 for securing a desired tape roll 90 within the tape applicator assembly 10. The hub 98 may be removably and rotatably secured on the shaft 130 by passing the shaft 130 though the center through-hole 118. When received on the shaft 130, the hub 98 is rotatable about the center longitudinal axis of the shaft 130 for dispensing tape.

A bearing subassembly 114 is defined between the shaft 130 and hub 98 to accommodate the rotation of the hub 98. Although any suitable bearing subassembly may be used, the bearing subassembly 114 includes first and second flanged bushings 144 and 148 disposed at each end of the shaft 130 between the shaft 130 and the interior cylindrical body portion 122 of the hub 98. In that regard, a cylindrical gap is defined between the exterior surface of the shaft 130 and the interior surface of the internal cylindrical body portion 122 for receiving the first and second flanged bushings 144 and 148. The first and second flanged bushings 144 and 148 may be secured within the center through-hole 118 of the hub 98 such that the bushings 144, 148 and the hub 98 are an assembled unit for easier assembly and disassembly.

The hub locking assembly 110 further includes a fastening subassembly 152 configured for selectively locking the hub 98 onto the shaft 130. The fastening subassembly 152 may include a fastener 156, such as a bolt, threadably receivable within a threaded opening (not labeled) in a second end of the shaft 130 (opposite the anchor 134). A knob 160 is integrally formed on or otherwise secured on the fastener 156 near the head of the fastener such that the threaded end of the fastener protrudes from the knob 160. The knob 160 is suitably graspable by a user for applying torque to the fastener 156 and securing the threaded end of the fastener 156 within the shaft 130. A washer 164 is disposed between the knob 160 and the hub 98 for allowing the knob 160 to be selectively engaged with and tightened against the hub 98. By tightening the knob 160 against the hub 98, the ease of which the hub 98 may rotate on the shaft 130 may be adjusted.

Referring to FIG. 7, an exemplary embodiment of a tape assembly 12 having a tape roll 90 will now be described in further detail. The tape roll 90 is defined by an elongated piece of tape 164 wound around the core 94. The tape 164 includes an exterior surface 168 and an opposite, interior surface 172. A pressure sensitive adhesive 176 is disposed on the interior surface 172 and is removably secured to the exterior surface 168 when configured on the roll 90.

The pressure sensitive adhesive 176 includes a middle adhesive portion 180 extending along a center longitudinal axis of the tape on the interior surface 172 of the tape 164. The middle adhesive portion 180 is disposed between first and second lateral adhesive portions 184 and 188, which are sufficiently tacky to be removably adhered to a desired surface, such as a floor or wall.

The middle adhesive portion 180 is configured to removably adhere to the bundled cables C being taped to the surface S. In that regard, the middle adhesive portion 180 is sufficiently wide to cover and engage the aligned, bundled cables passing through the tape applicator assembly 10. The width of the middle adhesive portion 180 may be varied on different tape rolls to accommodate cable bundles of different sizes.

The middle adhesive portion 180 is also less tacky than the first and second lateral adhesive portions 184 and 188 for releasably engaging the bundled cables. The middle adhesive portion 180 may be defined by a less tacky adhesive covering substantially the entire middle adhesive portion 180. In the alternative, the middle adhesive portion 180 may be defined by a pattern of adhesive coating (such as longitudinal or horizontal stripes, dots, etc.) that creates an overall less tacky area. Thus, it should be appreciated that the less tacky middle adhesive portion 180 may be defined in any suitable manner.

As noted above, typical gaffer tape includes a pressure-sensitive adhesive covering the entire interior surface of the tape that is sufficiently strong to secure the cable run to a surface until the tape is manually removed with a predetermined amount of force. The adhesive needs to be sufficiently strong to safely adhere to a desired surface without being easily removed due to foot traffic, etc. However, this stronger adhesive can cause the tape to become wrapped around or folded between the cable(s), causing the tape to stick to itself during the removal process. Moreover, when cables are "gaffed" often, adhesive residue builds up on the cables, making it more difficult to remove the tape from the cable.

With the middle adhesive portion 180 defining a channel of decreased tackiness, the tape 164 may be easily removed from the cables when the tape 164 is pulled up from the surface. If the middle adhesive portion 180 is at least somewhat tacky (e.g., a semi-dry channel), the tape 164 can stick to the cables and help maintain the alignment and straightness of the cables when being taped to the surface. For instance, the middle adhesive portion 180 may be between about 10-30% of the tackiness of the first and second lateral adhesive portions 184 and 188. However, it should be appreciated that the middle adhesive portion 180 may instead have no adhesive (e.g., a dry channel), or it may have greater than 30% tackiness, if desired. In other words, the middle adhesive portion 180 may be between 0-99% of the tackiness of the first and second lateral adhesive portions 184 and 188 to define a less tacky middle adhesive portion 180 for releasably engaging the cables.

It should be appreciated that the tape roll 90 may instead be configured as tape strips, sheets, or another configuration for use apart from the tape applicator assembly 10. Moreover, although the tape applicator assembly 10 is shown and described in use with a tape assembly 12 having a middle adhesive portion 180 of decreased tackiness, the tape applicator assembly 10 may instead be used with any suitable tape. For instance, if the tape applicator assembly 10 is being used to mark boundary lines on a floor, rather than taping cables to the floor, a tape having any suitable pressure sensitive adhesive on its interior surface may be used. Thus, the description and illustrations provided herein should not be seen as limiting the scope of the claimed subject matter.

Referring back to FIG. 5, the operation of the tape applicator assembly 10 for taping cables to a surface will now be provided. Prior to using the tape applicator assembly 10, the proper width of the tape (i.e., its axial length) may be determined for the intended use. For instance, if 2-3 cables need to be taped to a surface, a tape roll that is, for example, 2-3 inches wide, and having a middle adhesive portion 180 sufficiently wide and tacky, may be used. In the alternative, if the tape applicator assembly 10 is merely being used to mark boundary lines on a surface, a tape roll that is, for example only 1 inch wide with no middle adhesive portion, may instead be used. Thus, depending on the intended use, a preferred tape roll 90 may be installed within the tape applicator assembly 10 or switched with a tape roll 90 already installed within the tape applicator assembly 10.

The tape roll 90 is installed within the tape applicator assembly 10 by centering and locking the core 94 on the hub 98 with the core centering and locking assembly 100. More specifically, the core 94 is slid onto the hub 98 until the nub 102 is received within the annular groove 106. It can be appreciated that when the nub 102 is received within the annular groove 106, a "snap-fit" tactile sensation will be felt by the user to indicate the core 94 is properly positioned on the hub 98. Markings, instructions, etc., may be provided on the exterior of the body 14, core 94, and/or hub 98 to aid in proper assembly.

With the core 94 assembled on the hub 98, the hub 98 may be secured within the body 14 through the hub locking assembly 110. More specifically, the hub 98 is secured onto the shaft 130 by passing the shaft 130 through the center through-hole 118 of the hub 98. The fastener 156 is then secured within the shaft 130 to secure the hub 98 onto the shaft 130 for rotation of the tape roll 90 within the tape applicator assembly 10. The fastener 156 may be tightened or loosened to increase or decrease the tension of the knob 160 against the washer 164. With increased tension from the knob 160, the tape roll 90 will unravel less easily and quickly. Thus, it can be appreciated that the tension from the knob 160 may be adjusted as desired.

Once the core 94 is secured within the tape applicator assembly 10, the tape roll 90 may be partially unraveled to position the tape 164 for dispensing. In the alternative, the tape roll 90 may be partially unraveled before securing the core 94 on the hub 98. The tape 164 is pulled from the tape roll 90 from the bottom, interior, open surface of the body 14 downwardly past the rear wheel assembly 66. The end of the tape 164 may be secured to the surface S and/or cables C for defining a first end of a cable run R.

A tape tensioner 194 may be disposed within the interior of the body 14 between the tape roll 90 and the rear wheel assembly 66 for maintaining tension in the tape 164 as it is dispensed from the roll 90. The tape tensioner 194 may be a suitable roller or other device journaled for rotation within an interior side of the body 14 in a suitable manner. To effectively maintain tension in the tape 164, the tape tensioner 194 is positioned downwardly from a tangent defined between the tape roll 90 and the rear wheel assembly 66. In this manner, the tape tensioner 194 imposes a downward force on the tape 164 to maintain a substantially constant tension while being dispensed. With tension in the tape 164, the rear wheel assembly 66 maintains better tape alignment on the surface/cables and reduces any wrinkles, gaps, etc.

The middle tape applying portion 70 partially compresses to apply pressure to both the cables C and the surface S as the tape 164 passes over the rear wheel assembly 66. More specifically, with the cables C centrally aligned after passing through the funnel 52 (and held taught by the flat spring 60), a central portion of the middle tape applying portion 70 compresses to accommodate the height and shape of the cables C relative to the surface S. Moreover, the lateral edges of the middle tape applying portion 70 compress to apply pressure to the surface S on each side of the cables C for sealing the cables C beneath the tape 164.

It can be appreciated from the foregoing that the tape applicator assembly 10 and tape assembly 12 provide the benefit of securing aligned, bundled, taught cable(s) to a surface without causing the tape to irreversibly stick to or leave residue on the cable(s).

Figure 8B:
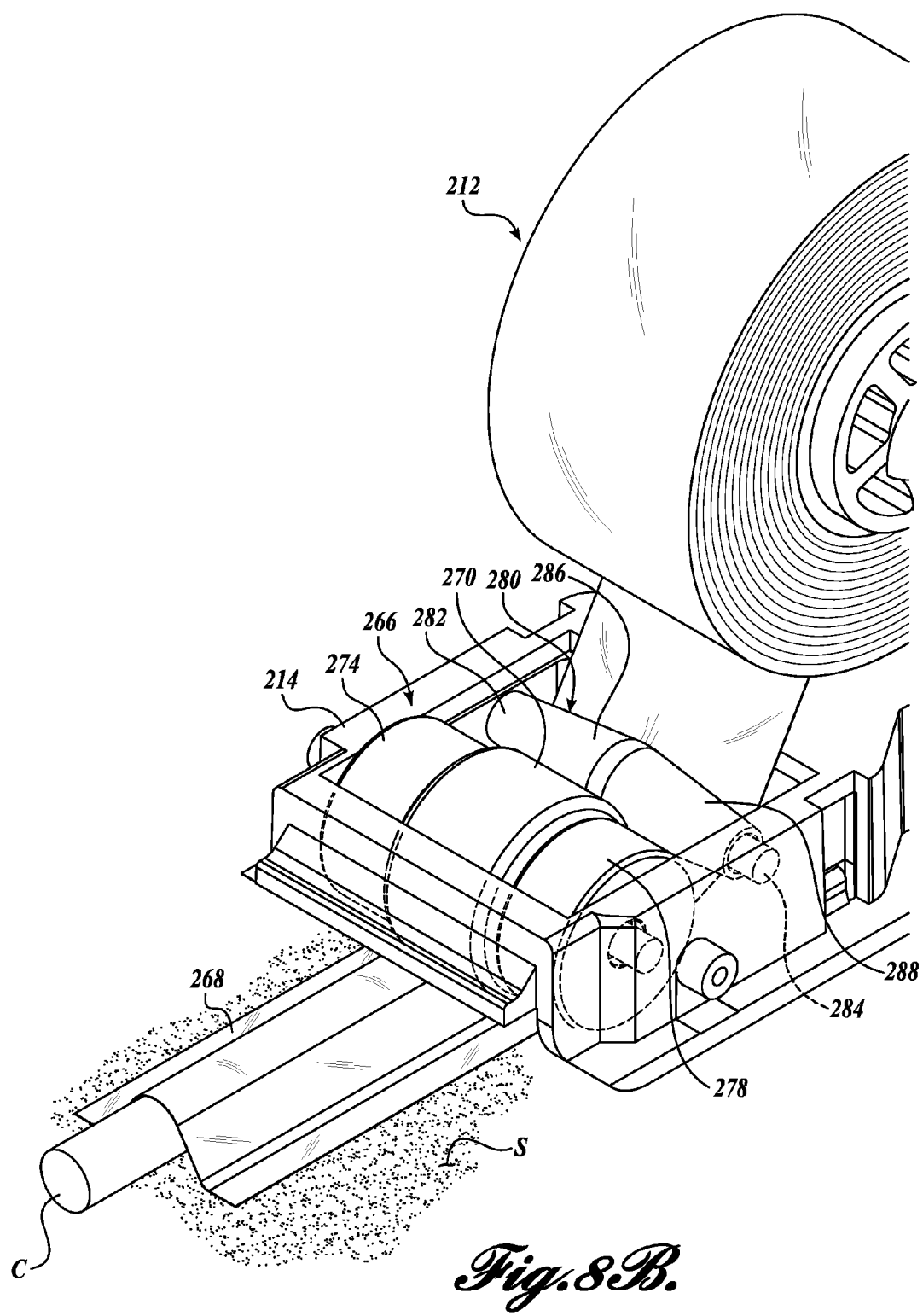
FIG. 8B is a top isometric view of the tape applicator assembly of FIG. 8A, wherein a portion of the tape applicator assembly has been removed for illustration.

Referring to FIGS. 8A and 8B, a first alternative embodiment of the tape applicator assembly 210 is depicted. The tape applicator assembly 210 is substantially identical to the tape applicator 10 described above except for the differences set forth herein.

In that regard, the tape applicator assembly 210 includes a cable alignment assembly having a funnel 252 extending from a front of a body 214 along the bottom thereof. The funnel 252 defines a front cable opening 248 at the front of the body 214 configured to receive one or more cables as the body 214 moves along a surface, and a rear cable opening 254. As can be seen in FIGS. 8A and 8B, the rear cable opening 254 is configured to bundle and align one or more cables C in a cable run R and tape the cable C run R to a surface. Moreover, the rear cable opening 254 may be adjusted in size and shape through a modular funnel/wheel adjustment assembly 256 to accommodate various sizes of cables and bundles of cables.

The modular funnel/wheel adjustment assembly 256 is defined by a first adjustable funnel piece 257 that is removably receivable within the underside of the body 214. The first adjustable funnel piece 257 is defined in part by a rear funnel portion 258 disposed at the rear of the funnel 252 and a wheel portion 253 extending rearwardly from the rear funnel portion 258, with the rear funnel portion 258 substantially corresponding in size to the wheel portion 253 for aligning, bundling, and taping one or more cables of a predetermined size to a surface. In the depicted embodiment, the rear funnel portion 258 and the wheel portion 253 of the first adjustable funnel piece 257 are correspondingly sized and shaped to align and tape a cable C of a first predetermined size to a surface S.

The rear funnel portion 258 defines a rear portion of the funnel 252 and the rear cable opening 254 for aligning the cable C. When received within the body 214, the rear funnel portion 258 defines an elongated opening 262 extending between and in communication with the front cable opening 248 and the rear cable opening 254. The elongated opening 262 is of a suitable cross-sectional shape, width and/or depth for bundling and aligning one or more cables of a predetermined size. In the depicted embodiment, the elongated opening 262 is of a suitable cross-sectional shape, width and depth for aligning the cable C of a first predetermined size. A second adjustment piece having a second cross-sectional shape and a wider and/or deeper elongated opening 262 may be used to accommodate a larger cable or a larger bundle of cables, whereas a third adjustment piece having a third cross-sectional shape and a narrower and/or shallower elongated opening 262 may be used to accommodate a smaller cable or a smaller bundle of cables. With the shape and size of the elongated opening 262 substantially corresponding to the shape and size of the one or more cables, the cables will be aligned and bundled prior to being taped by a tape applying assembly.

The tape applying assembly is defined in part by the wheel portion 253 of the first adjustable funnel piece 257, with the wheel portion 253 being suitable sized for taping one or more cables of a predetermined size to a surface. The wheel portion 253 is configured to rotatably secure a rear wheel assembly 266 within the body 214 for applying pressure to the tape 268 and one or more cables, similar to rear wheel assembly 66. In that regard, the wheel portion 253 includes first and second wheel assembly arms 260 and 261 that extend from the rear funnel portion 258 toward the rear of the body 214. The wheel assembly arms 260 and 261 are configured to rotatably receive the rear wheel assembly 266 therein.

The rear wheel assembly 266 includes a middle tape applying portion 270 disposed between lateral rear rolling wheels 274 and 278, wherein the middle tape applying portion 270 is sufficiently pliable to apply pressure to the surface and the one or more cables for securing the tape 268 to the surface and the one or more cables. As can be seen in FIGS. 8A and 8B, the middle tape applying portion 270 is also sufficiently wide for applying pressure to the cable C of a first predetermined size and a portion of the surface S on each side of the cable C. Moreover, the width of the middle tape applying portion 270 may be adjusted by using a different adjustable funnel piece 257.

More specifically, the first adjustable funnel piece 257 (having an elongated opening 262 and middle tape applying portion 270 of a first predetermined size and shape) may be removed and replaced by a second adjustable funnel piece 257 (having an elongated opening 262 and middle tape applying portion 270 of a second predetermined size). As such, the adjustable funnel piece 257 may be removed and replaced as needed to accommodate various sizes of cables and/or bundles or cables, thereby avoiding individual adjustment of the funnel 252 or rear wheel assembly 266.

The funnel/wheel adjustment assembly 256 may be removably secured within the body 214 in any suitable manner. In the embodiment depicted, a snap fit technology (not labeled) is used. However, it should be appreciated that any suitable technology may be employed.

Referring to FIG. 8B, the tape applying assembly may further include a tape guide 280 positioned between the tape assembly 212 and the rear wheel assembly 266 that is configured to shape and conform the cable for being adhered to the cable C and the surface S. The tape guide 262 includes a tape shaper 282 that is journaled for rotation on a pin 284 received within the body 214. The tape shaper 282 is defined by first and second frustoconical portions 286 and 288 each having tapered ends disposed opposite one another.

The non-adhesive side of the tape 268 may pass beneath the tape guide 262 before engaging the rear wheel assembly 266. The tape guide 262 imposes tension on the tape 268 to reduce any slack in the tape 268 and helps prevent the tape from folding, twisting, etc. In that regard, the tape shaper 282 may be made from foam or any suitable material. If made from a compressible or deformable material such as foam, it can be appreciated that the tape shaper 282 will help maintain tension in the tape as it is being applied. However, it should be appreciated that the tape shaper 282 may be made from any suitable material.

The tape guide 262 also shapes the tape 268 for optimally laying the tape 268 onto a cable C and adhering the tape 268 to the cable C. More specifically, the tape guide 262 shapes the tape 268 into an inverted V-shape such that the apex of the V, on the adhesive side, is engaged with the top of the cable C as the cable C is drawn through the tape applicator assembly 310. In this manner, the tape 268 is securely and smoothly adhered to the cable C without any pressure being applied by the rear wheel assembly 266. Moreover, the tape 268 is adhered to the cable C on substantially the center longitudinal axis of the tape 268, or along the middle adhesive portion of the tape (if present). In this manner, an equal amount of tape 268 is adhered to the surface S on each side of the cable C to define a substantially straight, secure cable run R.

Referring to FIG. 9, a second alternative embodiment of a tape applicator assembly 310 is depicted. The tape applicator assembly 310 is similar to the tape applicator assemblies 10 and 210 described above; however, the tape applicator assembly 310 is suitable for receiving a wider tape assembly 312, and the assembly is likewise suitable for aligning, bundling, and taping a larger cable or bundle of cable C to a surface S to define a cable run R.

To accommodate a larger tape assembly 312, the body 314 of the tape applicator assembly 310 includes a tape receiving cavity 332 defined within a top portion of the body 314 and extending downwardly into the body 314. The tape assembly 312 is removably inserted into the tape receiving cavity 332 by dropping the tape assembly 312 down into the tape receiving cavity 332 within the body 314. First and second side portions of the body 314 are disposed on each side of the tape assembly 312 when received therein. First and second hub locking assemblies are disposed on each side of the body 314 for removably securing the tape assembly 312 therein. Each of the first and second hub locking assemblies are substantially identical; therefore, only the first hub locking assembly 346 is described and depicted.

The first hub locking assembly 346 includes a U-shaped shaft receiving portion 350 defined at an upper end of the first side portion of the body 314 that is configured to removably receive a first end of a hub shaft 352 running centrally through the hub 318. The shaft 352 is rotatably receivable within the shaft receiving portion 350 such that the tape assembly 312 may rotate about the axis defined by the shaft 352. A locking pin 354 may pass through the shaft receiving portion 350 to removably secure the shaft 352 within the shaft receiving portion 350. Any suitable locking pin or other locking mechanism may be used for removably securing the shaft 352 rotatably within the body 314.

The tape applicator assembly 310 further includes front and rear handles 322 and 324 defined on or otherwise formed on the body 314 for transporting, holding, and moving the tape applicator assembly 310. The front and rear handles 322 and 324 aid the user in moving the tape applicator assembly 310 when the tape assembly 312, which is wider and heavier than smaller tape assemblies, is received within the body 314. A handle assembly (not shown) may also be secured to the body 314 for moving the tape applicator assembly 310 along a surface S. Any suitable handle assembly, such as the handle assembly 22 described above, may be used. Preferably, the handle assembly would extend from a rear portion of the body 314 for moving the body 314 forward along the cables C on a surface S.

Figure 11:
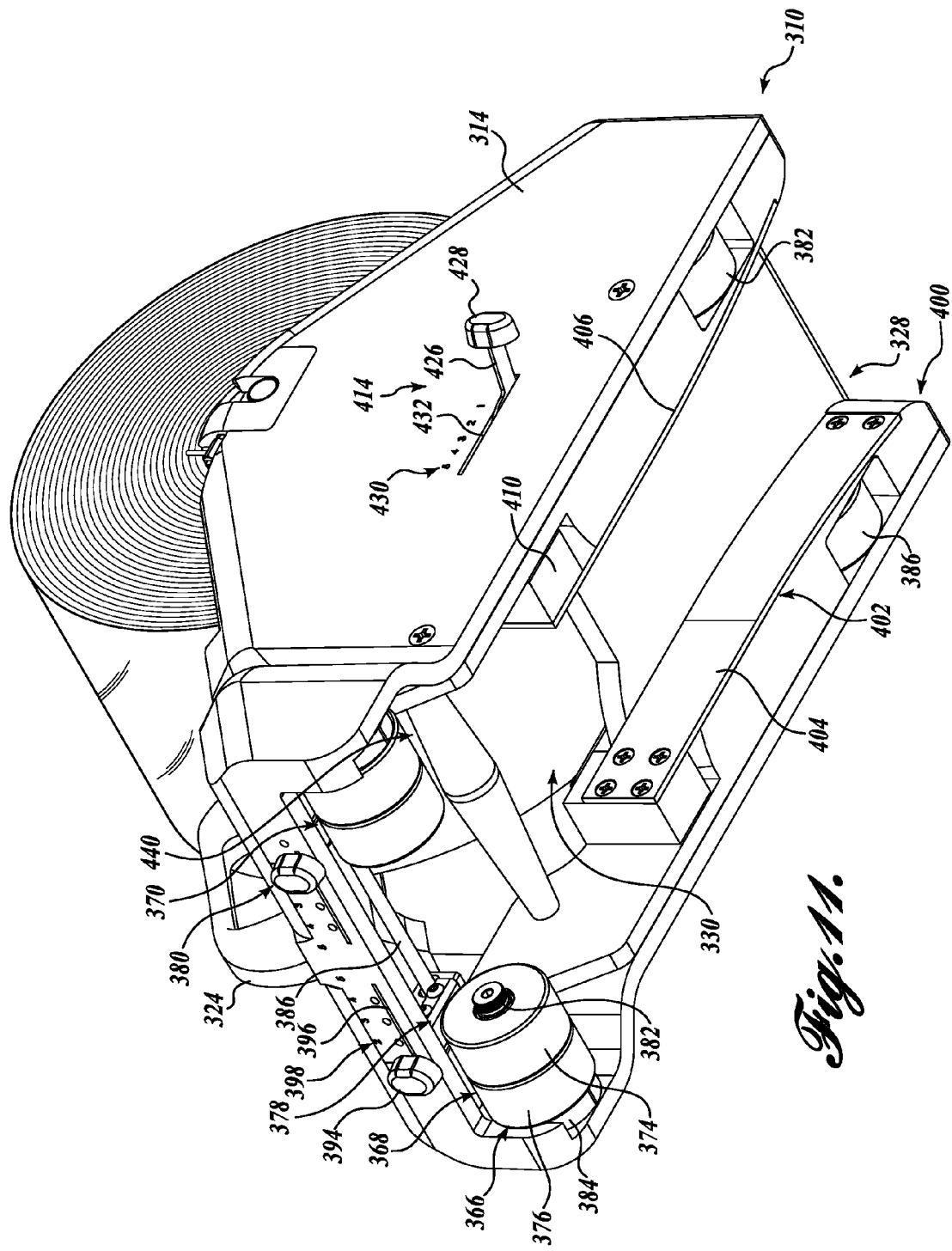
FIG. 11 is a bottom isometric view of the tape applicator assembly of FIG. 9.
Figure 12:
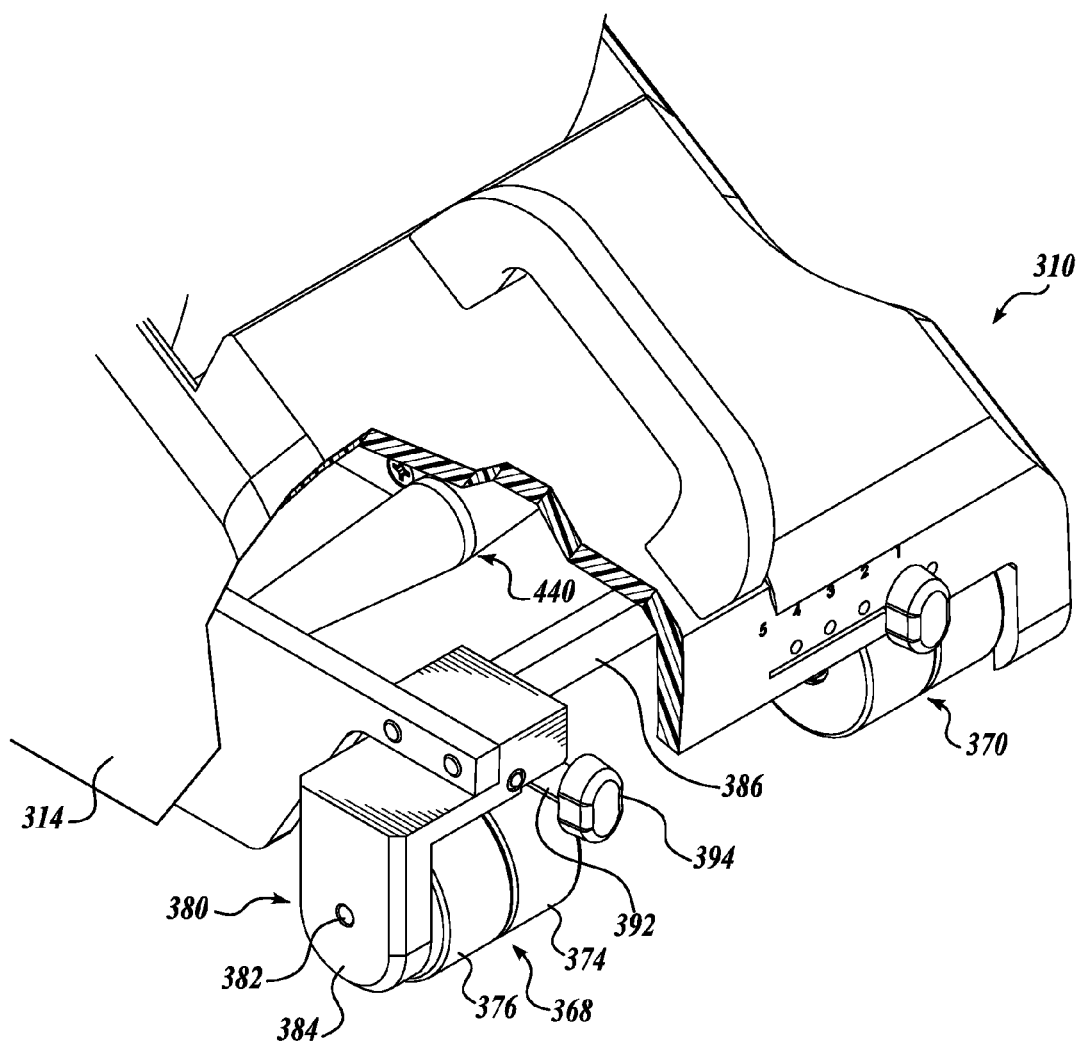
FIG. 12 is a partially broken away isometric view of a portion of the tape applicator assembly of FIG. 9.

Referring to FIGS. 10-12, the tape applicator assembly 310 includes a tape applying assembly and a cable alignment assembly that are configured for accommodating various sizes, shapes, and bundles of one or more cables to be taped to a surface. The tape applying assembly is defined in part by an adjustable rear wheel assembly 366 having first and second rear wheel sets 368 and 370 and first and second rear wheel adjustment assemblies 378 and 380 for adjusting the position of first and second rear wheel sets 368 and 370. The first and second wheel sets 368 and 370 and the first and second rear wheel adjustment assemblies 378 and 380, respectively, are substantially identical; therefore, only the first wheel set 368 and the first rear wheel adjustment assembly 378 will be hereinafter discussed in detail.

The first rear wheel set 368 includes inner and outer wheels 374 and 376 journaled for rotation on a wheel pin 382. The wheel pin 382 extends from a wheel slider bracket 384 slidably disposed within the body 314. The wheel slider bracket 384 is slidably mounted to a rod 386 extending between lateral sides of the body 314. The first rear wheel set 368 may slide laterally within the body 314 through the wheel slider bracket 384 to laterally adjust the position of the first rear wheel set 368.

In that regard, a knob 394 may be used to manually move the wheel slider bracket 384 back and forth. The knob 394 is secured on the end of a knob arm 392, which extends through a slot 396 in the rear of the body 314. A plurality of positions 398, identified by numerals, indicators, or the like, may be defined on the body 314 near the slot 396 to assist the user in positioning the first rear wheel set 368 a desired distance from the lateral side of the body 314.

Figure 13:
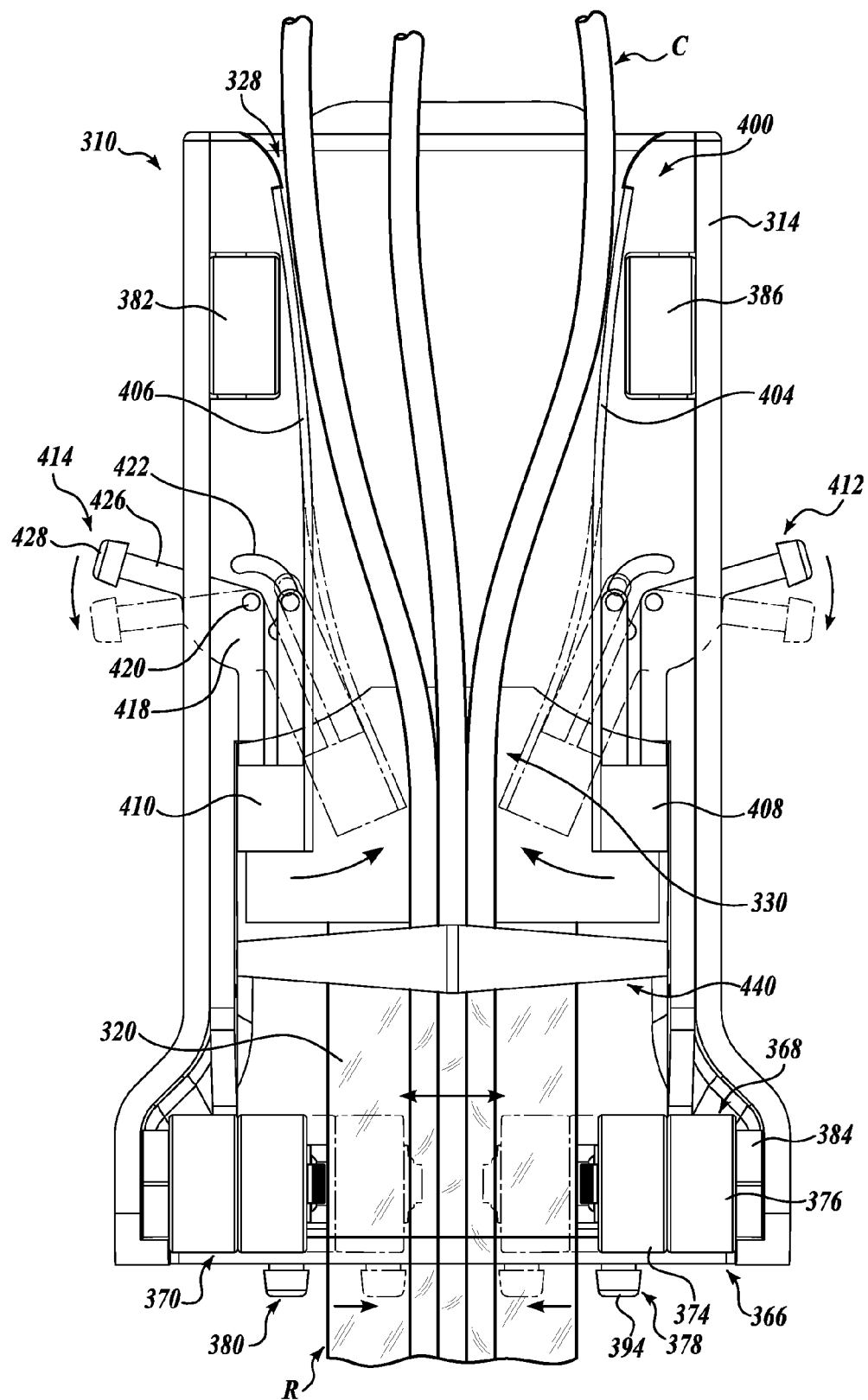
FIG. 13 is a bottom view of the tape applicator assembly of FIG. 9, wherein the tape applicator assembly is shown taping cables to a surface.

As can be seen in FIG. 13, the first and second rear wheel sets 368 and 370 may be moved toward or away from each through the first and second rear wheel adjustment assemblies 378 and 380 to accommodate smaller or larger cable(s) or bundles of cables. More specifically, the first and second rear wheel adjustment assemblies 378 and 380 can be used to increase or decrease the gap between the first and second rear wheel sets 368 and 370 to accommodate various sizes of cables or bundles of cables. In this manner, the tape applicator assembly 310 is adjustable in size to accommodate the cable or bundle size.

In the embodiment depicted, the first and second rear wheel sets 368 and 370 are moved toward one another to suitably tape three cables C to a surface. The first and second rear wheel sets 368 and 370 are moved toward one another a suitable amount to engage and apply pressure to the tape 320 on each side of the cables C. In this manner, the tape is securely attached to the surface to define a safe, clean cable run R. It should be appreciated that the inner wheel of each of the first and second rear wheel sets 368 and 370 may instead be deformable for applying suitable pressure to the cables C for attaching the tape 320 to the cables C. Moreover, it should be appreciated that any suitable rear wheel adjustment assembly may be used. For instance, the first and second rear wheel set adjustment assemblies 378 and 380 may instead automatically and/or simultaneously adjust inward or outward.

The tape applying assembly further includes a tape guide 440 for suitably shaping and conforming the tape for application onto the cables C. The tape guide 440 is substantially identical to the tape guide 262 described above. In that regard, the tape guide 440 shapes the tape 320 into an inverted V-shape such that the apex of the V, on the adhesive side, is engaged with the top of the cables C as they are drawn through the tape applicator assembly 310. In this manner, the tape 320 is securely and smoothly adhered to the cables C even if the first and second rear wheel set adjustment assemblies 378 and 380 dot not apply pressure to the cables C. Moreover, the tape 320 is substantially centered on the cables C such that a substantially equal amount of tape 320 is adhered to the surface S on either side of the cables C.

Referring to FIGS. 11 and 13, the cable alignment assembly includes a funnel assembly 400 configured to align and bundle various sizes and shapes of one or more cables to be taped by the tape applying assembly. The funnel assembly 400 includes a funnel 402 defined by a first funnel guide 404 extending along a first interior side of the body 314 and a second funnel guide 406 disposed opposite the first funnel guide 404 and extending along a second interior side of the body 314.

A front cable opening 328 is defined at a front end of the first and second funnel guides 404 and 406, and a rear cable opening 330 is defined at a rear end of the first and second funnel guides 404 and 406 for defining the funnel 402. As such, one or more cables lying on a surface may enter into the tape applicator assembly 310 at the front cable opening 328 when the tape applicator assembly 310 is moved along the surface toward the cables. As can be seen in FIG. 13, the cables C are received within the front cable opening 328 of the tape applicator assembly 310 and are bundled and aligned when they pass through the rear cable opening 330.

The funnel assembly 400 includes first and second funnel adjustment assemblies 412 and 414 configured to adjust the size of the rear cable opening 330 for accommodating various sizes and shapes of one or more cables. The first and second funnel adjustment assemblies 412 and 414 are substantially identical; therefore, only the second funnel adjustment assembly 414 will be hereinafter described in detail.

The second funnel adjustment assembly 414 includes an adjustment block 410 secured to or otherwise formed on a rear end of the second funnel guide 406 between the second funnel guide 406 and the body 314. The adjustment block 410 is secured to an adjustment bracket 418 that is pivotal about a pivot point 420 (defined by a fastener or otherwise) to move the second adjustment block 410 (and therefore the rear end of the second funnel guide 406) toward or away from the first funnel guide 404.

The pivot 420 is defined substantially near a midpoint of the second funnel guide 406 such that the adjustment block 410, and therefore the end of the second funnel guide 406, move along an arc-shaped path defined by the end of the adjustment bracket 418. In that regard, the first and second funnel guides 404 and 406 are made from a suitably flexible material, such as plastic or metal. To aid in the movement, a portion of the adjustment bracket 418 may be slidably secured within a pivot slot 422 defined in the body 314 through a fastener or otherwise, with the pivot slot 422 substantially mirroring the arc-shaped path. The fastener may slide within the pivot slot 422 to help support the arc-shaped movement of the bracket 418.

The adjustment bracket 418 may be manipulated by a user through a suitable knob assembly. The knob assembly includes a knob 428 defined on the end of a knob arm 426 extending from the adjustment bracket 418 and protruding through a slot 432 in the body 314. The knob 428 may be manipulated by a user to pivot the adjustment bracket 418 about pivot 420 for adjusting the position of the second funnel guide 406.

The second funnel adjustment assembly 414, manipulated by knob 428, moves the rear end of the second funnel guide 406 toward or away from the first funnel guide 404. In that regard, the first and second funnel adjustment assemblies 412 and 414 may be used to increase or decrease the size of the rear cable opening 330 to accommodate smaller or larger cables. In other words, the funnel 402 may be suitably sized at the rear cable opening 330 to appropriately bundle and align the one or more cables for taping by the adjustable tape applying assembly. In the embodiment of FIG. 13, the first and second funnel adjustment assemblies 412 and 414 are used to decrease the size of the rear cable opening 330 for aligning and bundling three cables for taping.

A plurality of indicators, reference numerals, etc., may be disposed on the exterior of the body 314 near slot 432 to indicate various positions of the adjustment bracket 418. In this manner, both the first and second funnel adjustment assemblies 412 and 414 may be adjusted a similar amount to help align one or more cables centrally within the tape applicator assembly 310. It should be appreciated that the first and second funnel adjustment assemblies 414 and 416 may instead simultaneously and/or automatically adjust based on the cable sizes.

Figure 14:
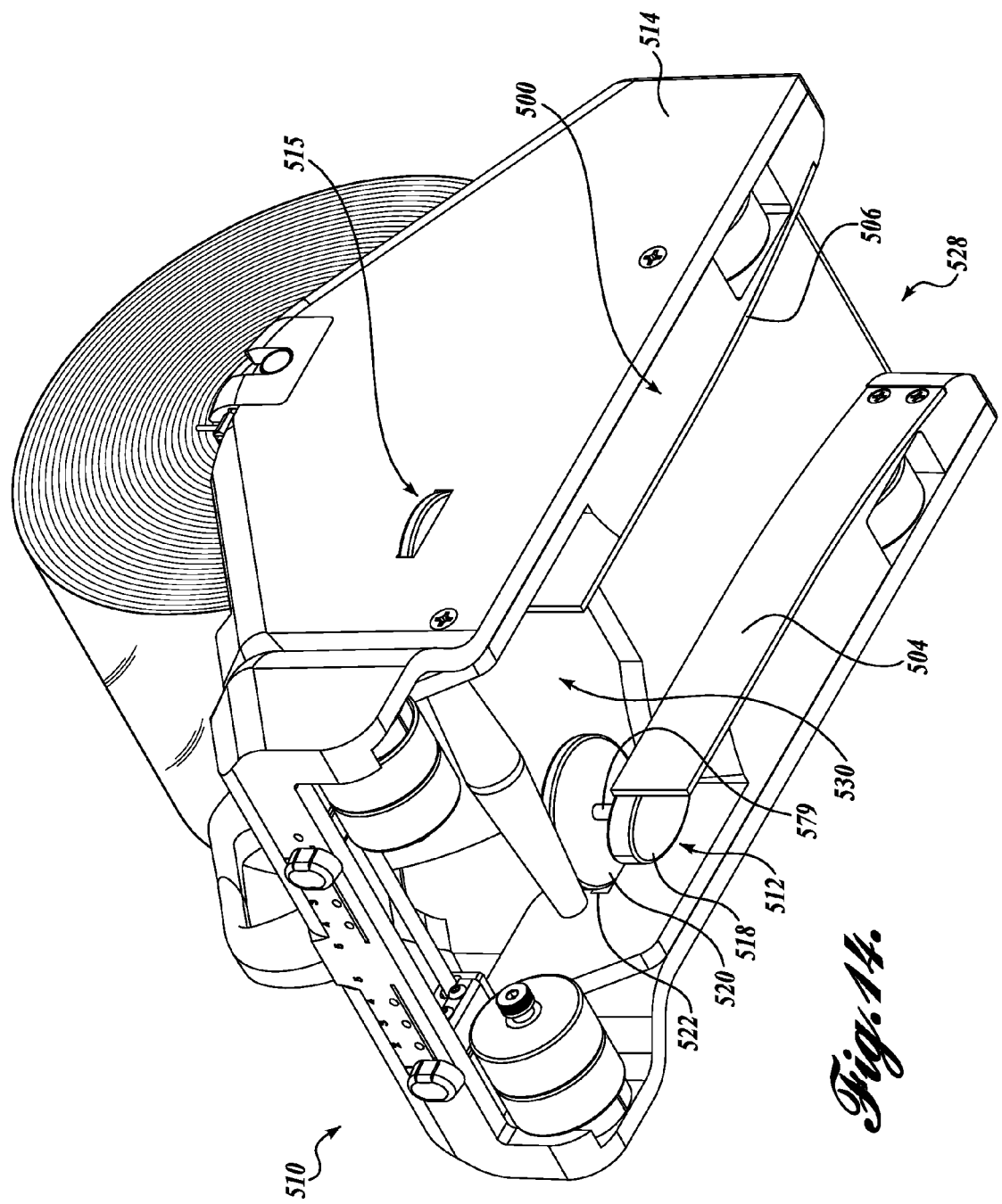
FIG. 14 is a bottom isometric view of a third alternate embodiment of a tape applicator assembly.

Referring to FIG. 14, a fourth alternate embodiment of a tape applicator assembly 510 is depicted. The tape applicator assembly 510 is substantially identical to the tape applicator assembly 310 described above except for the differences hereinafter provided. The tape applicator assembly 510 includes first and second funnel adjustment assemblies 512 and 514 suitable for adjusting the size of a rear cable opening 530, wherein the rear cable opening 530 is defined by first and second funnel guides 504 and 506. The first and second funnel adjustment assemblies 512 and 514 are substantially identical; and therefore, only the first funnel adjustment assembly 512 will be described in detail.

The first funnel adjustment assembly 512 includes an oval-shaped portion 518 that is movable about the axis of a pin 519 extending between the oval shaped portion 518 and a knob 520. The knob 520 is substantially circular in shape and is sized to protrude through a slot 522 in the body 514 of the tape applicator assembly 510. In this manner, a user may move the knob 520 about the axis of the pin 519 to likewise move the oval shaped portion 518 about the axis of the pin 519.

The oval-shaped portion 518 is moved about the axis of the pin 519 to selectively move into and out of engagement with the rear end of the first funnel guide 504 for adjusting the size of the rear cable opening 530. More specifically, when the oval-shaped portion 518 is moved about the axis of the pin 519 into a first position, the elongated end of the oval-shaped portion 518 engages the rear end of the first funnel guide 504. With the elongated end of the oval-shaped portion 518 engaged with the rear end of the first funnel guide 504 in the first position, the first funnel guide 504 is moved inwardly toward the second funnel guide 506, decreasing the size of the rear cable opening 530.

When the oval-shaped portion 518 is moved about the axis of the pin 519 into a second position, the elongated end of the oval-shaped portion 518 disengages the rear end of the first funnel guide 504. With the elongated end of the oval-shaped portion 518 disengaged with the rear end of the first funnel guide 504 in the second position, the first funnel guide 504 is moved outwardly away the second funnel guide 506, increasing the size of the rear cable opening 530. Thus, the first and second funnel adjustment assemblies 512 and 514 may be used to increase or decrease the size of the rear cable opening 530 to accommodate various sizes of cables.

Figure 15:
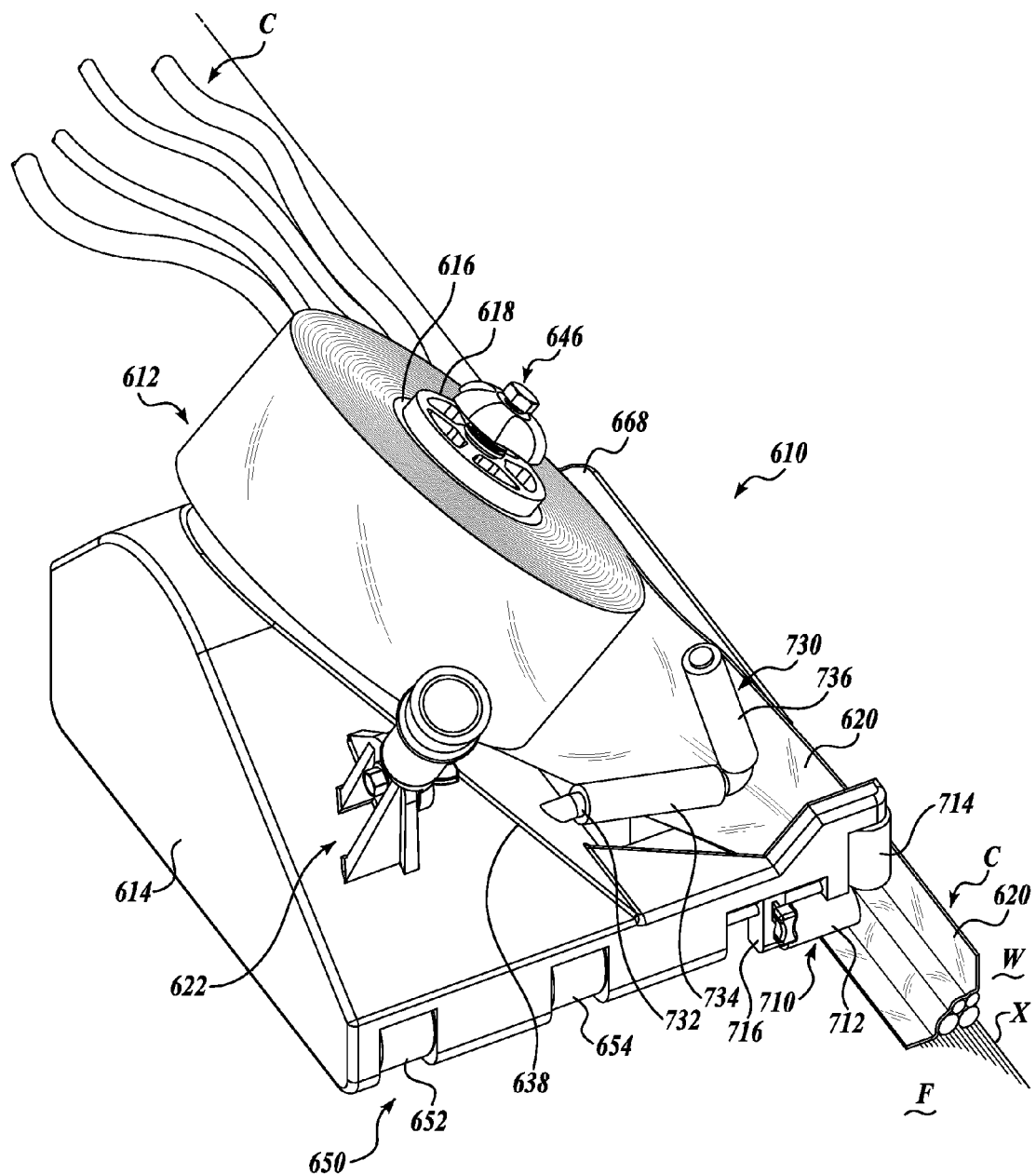
FIG. 15 is a front isometric view of a fourth alternate embodiment of a tape applicator assembly, wherein the tape applicator assembly is shown in use taping cables in a corner.

Referring to FIG. 15, a fourth alternate embodiment of a tape applicator assembly 610 is depicted. The tape applicator assembly 610 is configured to tape one or more cables C within a corner X defined by first and second substantially traverse surfaces, such as between a wall W and a floor F. Although the tape applicator assembly 610 will be hereinafter described as taping a cable run R within a corner X defined by a wall W and a floor F, the tape applicator assembly 610 may be used to tape a cable run R within any suitable corner.

The tape applicator assembly 610 includes a tape assembly 612 removably secured to a body 614 through a core/hub locking assembly 646, similar to the core/hub locking assembly 110 described above with reference to FIGS. 1-7. However, the tape assembly 612 is removably mounted to the body 614 at an angle for dispensing the tape 620 into the corner X.

More specifically, the tape assembly 612 is mounted to an angled body portion 638 defined by the body 614, wherein the angled body portion 638 is at a substantially one hundred thirty-five degree (135°) angle relative to the floor F and a forty-five degree (45°) angle relative to the wall W when the tape applicator assembly 610 is positioned in the corner X. In this manner, tape 620 can be dispensed at an angle in the direction of the corner X from the tape assembly 612 and adhered to cables extending along the corner X.

The tape dispenses from the tape assembly 612 down toward a front corner of the body 614 where an adjustable wheel assembly 710 is disposed for applying pressure to the tape 620 within the corner X. Referring to FIGS. 15-18, the adjustable wheel assembly 710 is defined by first and second substantially transversely disposed wheels, or a floor-engaging wheel 712 and a wall-engaging wheel 714. When positioned within the corner X, the floor-engaging wheel 712 is positioned to engage the floor F, and the wall-engaging wheel 714 is positioned to engage the wall W.

The floor-engaging wheel 712 and the wall-engaging wheel 714 may be journaled for rotation within the body 614 in any suitable manner. Moreover, one or more of the wheels may be adjustable in position for suitably engaging and taping various sizes of cables and/or bundles of cables. In the embodiment depicted, the floor-engaging wheel 712 of the adjustable wheel assembly 710 is slidably mounted within the body 614 such that the lateral position of the floor-engaging wheel 712 may be adjusted relative to the wall-engaging wheel 714.

The floor-engaging wheel 712 may be slidably secured to slide rails 718 extending from a portion of the body 614 through an adjustment bracket 716. An adjustment knob 720 may extend from the bracket 716 for allowing a user to manually grasp and slide the floor-engaging wheel 712 along the slide rails 718. The floor-engaging wheel 712 may be moved laterally toward the wall-engaging wheel 714 to decrease a corner space (i.e., the corner space defined between the floor-engaging wheel 712 and the wall-engaging wheel 714) for taping a smaller cable or cables. Moreover, the floor-engaging wheel 712 may be moved laterally away from the wall-engaging wheel 714 to increase the corner space for taping a larger cable or cables.

In the embodiment depicted in FIG. 15, the floor-engaging wheel 712 is moved laterally toward the wall-engaging wheel 714 to decrease the corner space for taping four cables within a corner X. The tape 620 is then positioned between the floor-engaging and wall-engaging wheels 712 and 714 and the floor F and wall W, respectively, within the cables C disposed in the corner X. The floor-engaging wheel 712 applies pressure to the tape 620 and adheres the tape 620 to the floor F, and the wall-engaging wheel 714 applies pressure to the tape 620 and adheres the tape 620 to the wall W.

A tape guide 730 may be used to help shape and conform the tape 620 for application onto the cables C, floor F, and wall W. Similar to the tape guides 280 and 440, the tape guide 730 substantially shapes the tape 620 into an inverted V shape, with the apex of the V defined on the bottom, adhesive side of the tape 620. The apex of the V on the adhesive side of the tape 620 is positioned to lay onto the cables C in the corner X, substantially along the center longitudinal axis of the tape 620.

Referring to FIGS. 15-18, the tape guide 730 is defined by an angled core 732 secured to or otherwise extending from a portion of the body 614. The angled core 732 extends from the angled body portion 638 and is positioned substantially between the tape assembly 612 and the adjustable wheel assembly 710. The angled core 732 is substantially V-shaped, such that a first portion of the angled core 732 extends downwardly and laterally toward the wall W when the tape applicator assembly 610 is positioned in the corner X for taping (see FIG. 15). A second portion of the angled core 732 extends upwardly and away from the wall W when the tape applicator assembly 610 is positioned in the corner X for taping.

During the taping process, a piece of tape 620 may be pulled from the tape assembly 612 downwardly beneath the angled core 732 and toward the adjustable wheel assembly 710. The apex of the V-shape defined by the angled core 732 indents the tape 620 and shapes the tape 620 into a substantially inverted V-shape. In this manner, the apex of the V on the adhesive side of the tape 620 is positioned to lay onto the cables C in the corner X.

To aid the tape 620 in moving along the tape guide 730, first and second rollers 734 and 736 may be disposed on the first and second portions of the angled core 732. The first and second rollers 734 and 736 may be journaled for rotation on or otherwise movably disposed on the angled core 732 in any suitable manner. The first and second rollers 734 and 736 may be made from foam or any suitable material. If made from a compressible or deformable material such as foam, it can be appreciated that the first and second rollers 734 and 736 will help maintain tension in the tape as it is being applied. However, it should be appreciated that the tape guide 730 may be made from any suitable material or instead formed from one suitable piece of material.

It should further be appreciated that the angle defined between the first and second portions of the angled core 732 may be any suitable angle for suitably shaping and engaging the adhesive side of the tape 620 with the cables C in the corner X. In the depicted embodiment, the angle defined between the first and second portions of the angled core 732 is an acute angle. However, it should be appreciated that any suitable angle may be used for appropriately engaging the tape 620 with the cables C.

The tape guide 730 helps guide the tape 620 onto the cables C, and the adjustable wheel assembly 710 engages the tape 620 with the wall W and floor F to secure a cable run R within the corner X. Moreover, the adjustable wheel assembly 710 may be used to adjust the position of the floor-engaging wheel 712 to accommodate various sizes and shapes of cables.

A cable alignment assembly is defined forwardly of the adjustable wheel assembly 710 and the tape guide 730 for bundling and aligning the incoming one or more cables for taping within the corner X. The cable alignment assembly is defined by a funnel assembly 666 having a funnel 682 extending from the front of the body 614 to the rear of the body 614.

Figure 16:
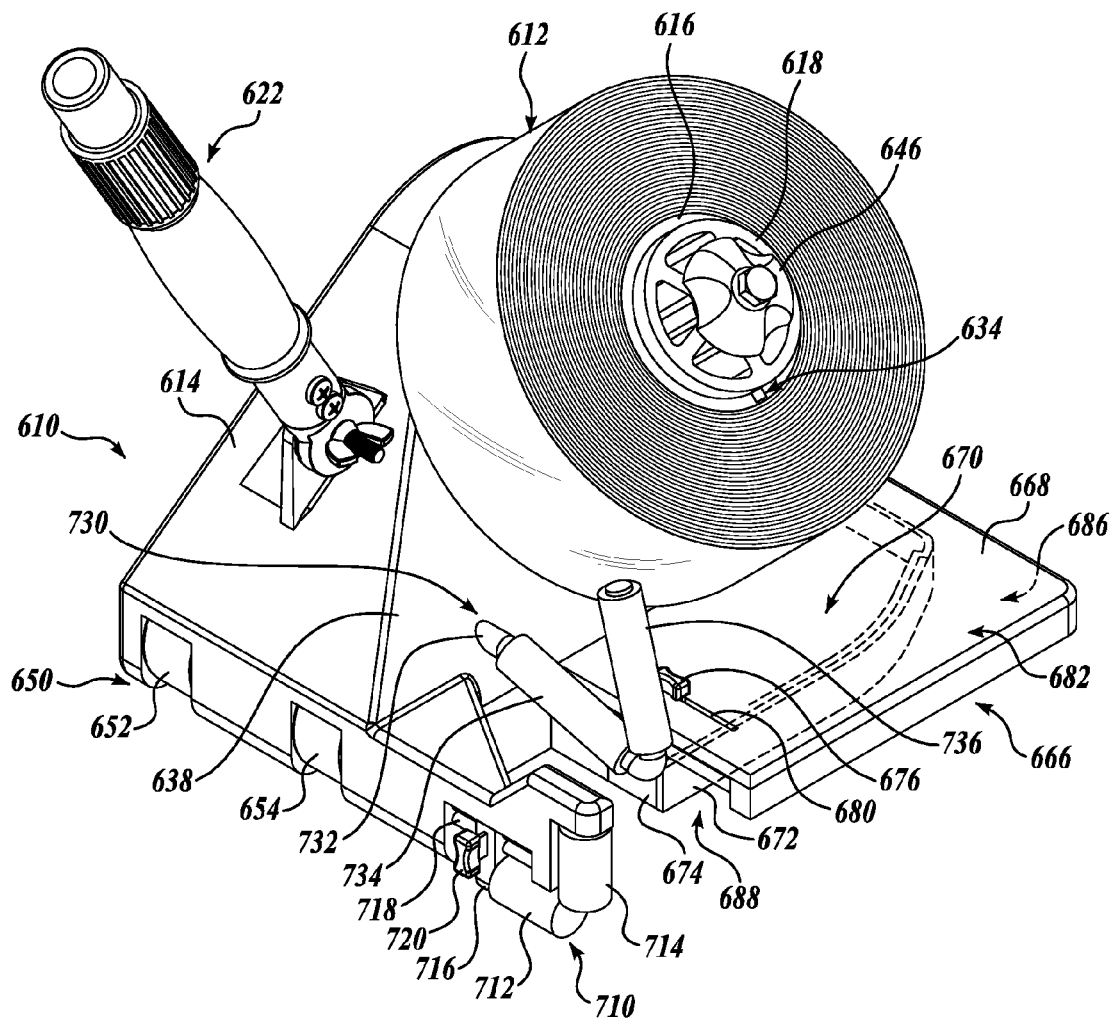
FIG. 16 is a side isometric view of the tape applicator assembly of FIG. 15.
Figure 17:
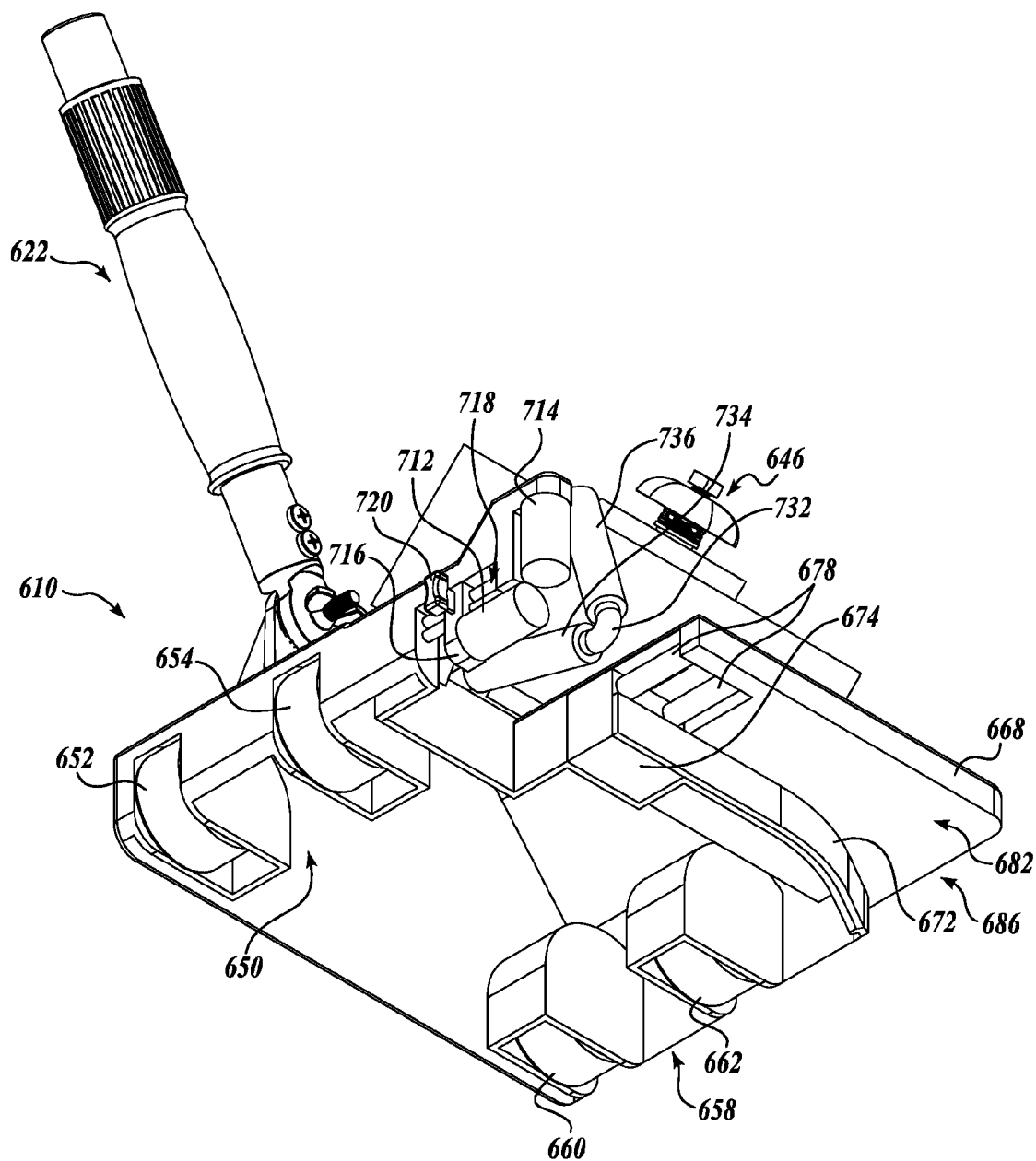
FIG. 17 is a bottom isometric view of the tape applicator assembly of FIG. 15.
Figure 18:
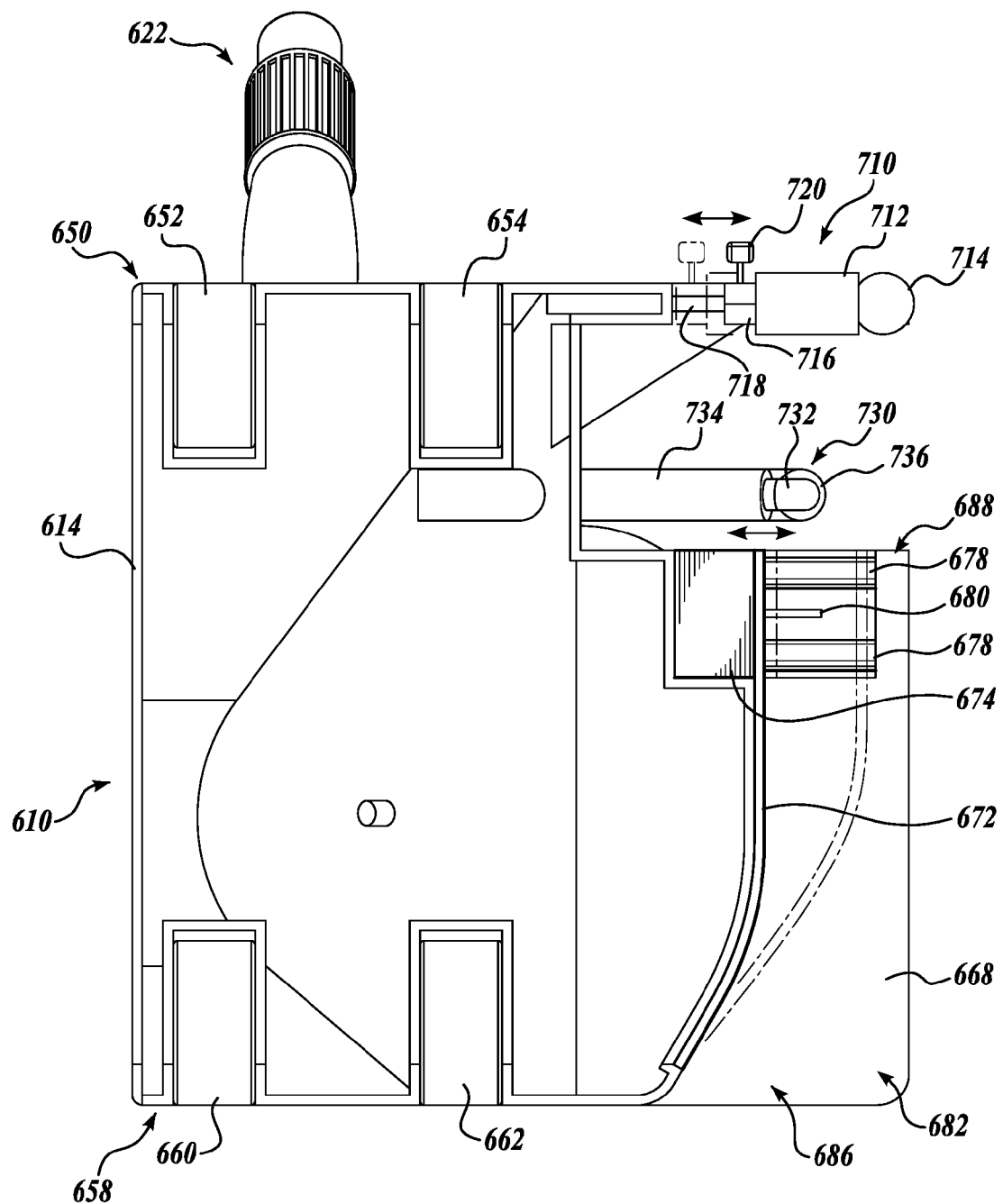
FIG. 18 is a bottom view of the tape applicator assembly of FIG. 15.

Referring to FIGS. 16-18, the funnel 682 is defined in part by a portion of the body 614. More specifically, the body 614 includes a funnel body portion 668 extending from the angled body portion 638 at an angle substantially parallel to the floor F. As can be seen in FIG. 15, a lateral edge of the funnel body portion 668 may be engaged with the wall W to suitable position the tape application assembly 610 against the corner X. In this manner, the wall W effectively defines a first portion of the funnel 682.

A second, opposing portion of the funnel 682 is defined by a funnel guide 672 secured beneath and extending along the funnel body portion 668. With a lateral edge of the funnel body portion 668 disposed against the wall W, a front cable opening 686 is defined at a front portion of the funnel body portion 668 between the wall W and the funnel guide 672. A rear cable opening 688 is defined at a rear portion of the funnel body portion 668 between the funnel guide 672 and wall W. Accordingly, the funnel is essentially defined between the funnel guide 672 and the wall W as the funnel body portion 668 moves along the wall W.

The funnel assembly 666 is adjustable in size to accommodate various sizes and shapes of cables. In that regard, the funnel assembly 666 includes a funnel adjustment assembly 670 configured to adjust the size of the rear cable opening 688. More specifically, the funnel adjustment assembly 670 is configured to move a rear end of the funnel guide 672 toward or away from the wall W to decrease or increase the size of the rear cable opening 688.

The funnel adjustment assembly 670 is defined by an adjustment block 674 secured to a rear, backside portion of the funnel guide 672. The adjustment block 674 is slidable laterally (toward and away from the wall W) along slide rails 678 disposed on the bottom, interior of the funnel body portion 668. An adjustment knob 676 is secured to the adjustment block 674 for moving the adjustment block 674 back and forth. The adjustment knob 676 is slidable within a slot 680 defined within the funnel body portion 668 such that it is accessible by a user. It should be appreciated that the rear end of the funnel guide 672 may instead be moved in any suitable manner, such as by automatic or electronic means.

As can be seen in FIG. 18, the adjustment block 674 is moved laterally along the slide rail 678 to adjust the size of the rear cable opening 688. More specifically, the adjustment block 674 is moved laterally toward the wall W to decrease the size of the rear cable opening 688 for accommodating a smaller cable or cables. To accommodate a larger cable or cables, the adjustment block 674 may be moved laterally away from the wall W to increase the size of the rear cable opening 688. With the rear cable opening 688 adjusted in size, the cable or cables are aligned and bundles within the corner X for taping by the adjustable wheel assembly 710.

To accommodate rolling of the body 614 along the floor F or any other suitable surface, the tape applicator assembly 610 includes a plurality of rolling wheels, such as a rear rolling wheel assembly 650 and a front rolling wheel assembly 658. The rear rolling wheel assembly 650 may include first and second rolling wheels 652 and 654 positioned along a rear edge of the body and journaled for rotation within the body 614 in a suitable manner, and the front rolling wheel assembly 658 may include first and second rolling wheels 660 and 662 disposed along a front edge of the body 614 and journaled for rotation within the body 614.

The tape applicator assembly 610 may further include a handle assembly 622 having a handle 624 secured to the body 614 for pushing, steering and manipulating the body 614 within a corner. In that regard, it can be appreciated that the handle 624 extends from the body 614 at an angle suitable for moving the body 614 along the corner. In the depicted embodiment, the handle 624 extends from the body 614 at about a 45° angle from the floor F and substantially parallel to the wall W. However, it should be appreciated that the handle 624 may instead be directed, at least partially, toward the wall W rather than being substantially parallel to the wall W. In this manner, the user could impose a force along the length of the handle 624 toward the corner X to help maintain the body 614 against the wall W during taping.

Figure 19:
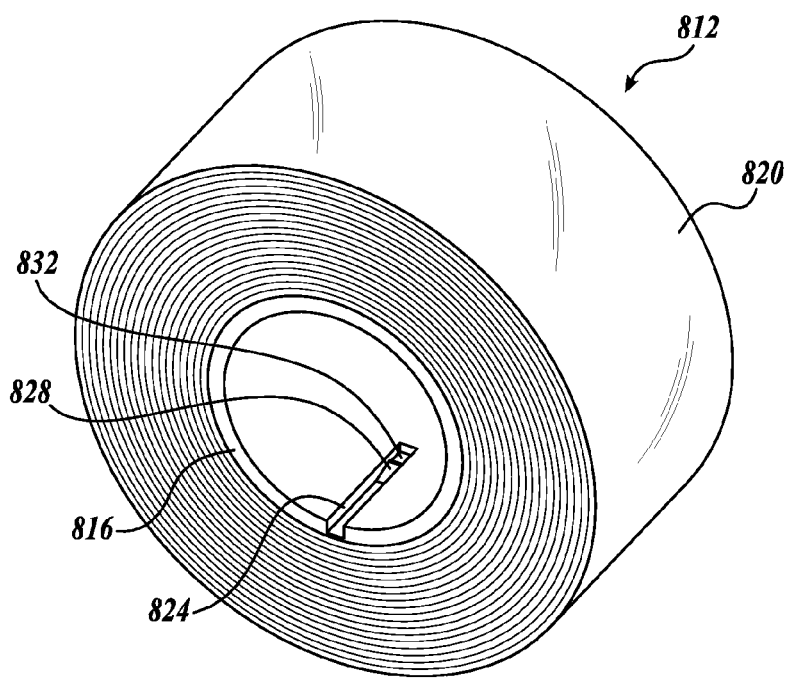
FIG. 19 is an isometric view of a first alternative embodiment of a centering and locking assembly of the tape applicator assembly of FIG. 1.
Figure 20:
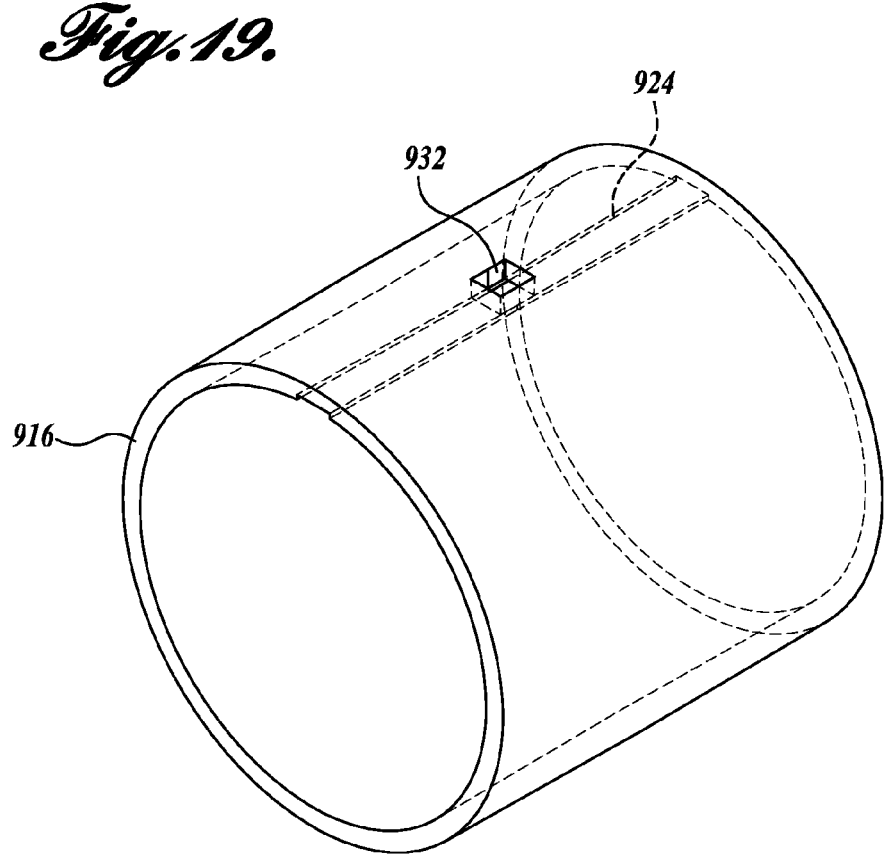
FIG. 20 is an isometric view of a second alternative embodiment of a centering and locking assembly of the tape applicator assembly of FIG. 1.

Referring to FIGS. 19 and 20, first and second alternative embodiments of a core centering and locking assembly 800 and 900 are depicted. The core centering and locking assemblies 800 and 900 are substantially similar to the core centering and locking assembly 100 in that they are each defined between a core and a hub for securing, centering and selectively locking the core onto the hub. The core of the core centering and locking assemblies 800 and 900 are configured to mate with a suitable hub having a substantially centered first locking feature, such as hub 98 having nub 102 (see FIG. 6). Accordingly, the core centering and locking assemblies 800 and 900 will be hereinafter described with reference to hub 98 having nub 102. However, it should be appreciated that the core centering and locking assemblies 800 and 900 may be comprised of any suitable hub. Moreover, the core centering and locking assemblies 800 and 900 may be used with tape applicator assemblies 10, 210, 510, or 610 or any other suitable tape applicator assembly.

Referring to FIG. 19, the core centering and locking assembly 800 comprises a second locking feature, such as notch 832 defined on the interior surface of a core 816, that is configured to removably receive the first locking feature, such as nub 102 on hub 98. The nub 102 is removably receivable within the notch 832 to removably secure the core 816 onto the hub 98. It should be appreciated that the notch 832 may instead be defined on the hub 98, and the nub 102 defined on the core 816.

The nub 102 and notch 832 are positioned on the hub 98 and core 816, respectively, such that the core 816 is automatically centered axially on the hub 98 when the nub 102 is received within the notch 832. In other words, the nub 102 is substantially centered axially on the hub 98, and the notch 832 is substantially centered axially on the core 816. In this manner, the core 816 will be automatically centered axially on the hub 98 when the nub 102 is received within the notch 832. With the notch 832 centered axially on the core 816, it should be appreciated that regardless of its axial length (i.e., 1 inch in axial length, 2 inches in axial length, 3 inches in axial length, etc.), the core 816 will be automatically centered on the hub 98.

A slot 824 may extend axially along the interior surface of the core 816 between the outer edge of the core 816 and the notch 832 to allow for easier mating of the hub 98 and the core 618. More specifically, the nub 102 may slide within the space defined by the slot 824 until it engages within the notch 832. In that regard, a ramp portion 828 is defined at the end of the slot 824 to provide a snap fit or tactile sensation to the user when the nub 102 is received within the notch 832. Instead of a ramp portion 828, the slot 824 may gradually decrease in depth as it extends toward the notch 832 (as shown on the core 94 in FIG. 6).

Referring to FIG. 19, the core centering and locking assembly 900 is substantially identical to the core centering and locking assembly 800 described above except that an axial slot 924 extends along the entire axial length of the interior of a core 916 and intersects a centrally located notch 932. In this manner, the core 916 may be mated with the hub 98 from either open end of the core 916. It should be appreciated that the core 916 may further include a ramped portion on either side of the notch 932 to provide a snap fit or tactile sensation to the user when the nub 102 is received within the notch 932. Moreover, any other suitable feature or combination of features may be used with either of the core centering and locking assemblies 800 and 900.

While illustrative embodiments have been illustrated and described, it will be appreciated that various changes can be made therein without departing from the spirit and scope of the present disclosure.

The invention claimed is:

1. A tape applicator assembly for securing at least one cable within a corner defined by a first surface and a second a surface, comprising:
   (a) a body moveable along the at least one cable positioned on the first surface;
   (b) a tape-receiving cavity defined in the body for receiving a tape assembly having tape, wherein the tape assembly is receivable within the tape-receiving cavity such that the tape is positioned for dispensing from the body; and
   (c) a tape applying assembly defined within the body, the tape applying assembly configured to adhere the tape to both the at least one cable and the first and second surfaces defining the corner as the body moves along the at least one cable on the first surface, wherein the tape applying assembly includes a wheel assembly disposed within a corner of the body that includes a first wheel rotatable about a first axis and a second wheel rotatable about a second axis disposed substantially transversely to the first axis, wherein the first wheel is configured to adhere the tape to the first surface and the second wheel is configured to adhere the tape to the second surface, and wherein the first wheel is moveable toward and away from the second wheel linearly along the first axis to accommodate the positioning of the at least one cable in the corner defined by the first and second surfaces beneath the tape.

2. The tape applicator assembly of claim 1, wherein the tape applying assembly further comprises a tape guide positioned between the tape assembly and the wheel assembly, wherein the tape guide is engageable with an exterior, non-adhesive side of the tape.

3. The tape applicator assembly of claim 2, wherein the tape guide is configured to shape the tape for engagement with the at least one cable positioned within the corner defined by the first and second surfaces.

4. The tape applicator assembly of claim 3, wherein the tape guide is configured to shape the tape such that an interior adhesive side of the tape engages the at least one cable positioned within the corner defined by the first and second surfaces on substantially a tape center longitudinal axis.

5. The tape applicator assembly of claim 3, wherein the tape guide includes a first portion and a second portion, wherein an acute angle is defined between the first and second portions.

6. The tape applicator assembly of claim 4, further comprising a cable alignment assembly having a funnel defined within a bottom interior of the body for receiving and substantially aligning the at least one cable with the tape center longitudinal axis, the funnel defining a front cable opening at a front portion of the body and a rear cable opening opposite the front cable opening, the funnel tapering in size from the front cable opening to the rear cable opening.

7. The tape applicator assembly of claim 6, wherein the funnel is defined by a funnel guide and the second surface when the tape applicator assembly is positioned for taping the at least one cable within the corner defined by the first and second surfaces.

8. The tape applicator assembly of claim 7, wherein the funnel guide is moveable toward or away from the second surface for increasing or decreasing the size of the rear cable opening.

9. A tape applicator assembly for securing at least one cable within a corner defined by a first surface and a second a surface, comprising:
(a) a body moveable along the at least one cable positioned on the first surface;
(b) a tape-receiving cavity defined in the body for receiving and positioning a tape assembly having tape such that the tape is positioned for dispensing from the body toward the corner defined by the first and second surfaces; and
(c) a tape applying assembly defined within the body, the tape applying assembly configured to adhere the tape to both the at least one cable and the first and second surfaces defining the corner as the body moves along the at least one cable on the first surface; and
(d) a cable alignment assembly having a funnel, wherein an upper portion of the funnel is defined by a funnel body portion of the body that is engageble with the second surface to position the body relative to the second surface, wherein a first side portion of the funnel is defined by a funnel guide positioned within an interior portion of the body, and wherein a second side portion of the funnel opposite the first side portion is defined by the second surface, wherein the funnel guide is engageble with the at least one cable to position the at least one cable in the corner defined by the first and second surfaces as the body moves along the first surface while engaging the second surface.

10. The tape applicator assembly of claim 9, wherein the funnel is configured to receive and substantially align the at least one cable with a tape center longitudinal axis.

11. The tape applicator assembly of claim 9, wherein the funnel defines a front cable opening at a front portion of the body and a rear cable opening opposite the front cable opening, the funnel tapering in size from the front cable opening to the rear cable opening.

12. The tape applicator assembly of claim 11, wherein the funnel guide is moveable toward or away from the second surface for increasing or decreasing the size of the rear cable opening.

* * * * *